United States Patent [19]
Iwahori et al.

[11] Patent Number: 5,978,353
[45] Date of Patent: Nov. 2, 1999

[54] MULTIPLEX TERMINAL STATION APPARATUS

[75] Inventors: Hitoshi Iwahori; Akito Koyamada; Hitoshi Takahira, all of Tokyo, Japan

[73] Assignees: Kabushiki Kaisha Toshiba, Kawasaki; Kokusai Denshin Denwa Co., Ltd., Tokyo, both of Japan

[21] Appl. No.: 08/697,455

[22] Filed: Aug. 23, 1996

[30]   Foreign Application Priority Data

Aug. 24, 1995  [JP]  Japan ................................... 7-215598

[51] Int. Cl.[6] .................................................. G01R 31/08
[52] U.S. Cl. .......................... 370/217; 370/463; 370/535
[58] Field of Search ................................... 370/216–228, 370/535–538, 420, 463, 464, 465; 340/825.01, 825.06, 825.05, 825.16, 827; 395/182.01, 182.02

[56]   References Cited

U.S. PATENT DOCUMENTS

| | | | |
|---|---|---|---|
| 5,042,031 | 8/1991 | Yokoyama et al. | 370/223 |
| 5,081,619 | 1/1992 | Nagata | 370/217 |
| 5,271,001 | 12/1993 | Hadano | 370/220 |
| 5,345,438 | 9/1994 | Ozaki | 370/220 |
| 5,598,402 | 1/1997 | Mizusawa et al. | 370/225 |
| 5,627,889 | 5/1997 | Eslambolchi | 379/221 |
| 5,799,001 | 8/1998 | Lee et al. | 370/220 |

*Primary Examiner*—Douglas W. Olms
*Assistant Examiner*—Seema S. Rao
*Attorney, Agent, or Firm*—Oblon, Spivak, McClelland, Maier & Neustadt, P.C.

[57]   ABSTRACT

A service-system low-speed interface unit and a protection-system low-speed interface unit are each provided with an optical transmitting/receiving module adapted to communicate signals with a main terminal. The protection-system low-speed interface unit is provided with another optical transmitting/receiving module for communicating signals with a part-time terminal. This module is selectable by a changeover switch in the protection-system low-speed interface unit. The connected configuration in the service system and the protection system is changed to allow the main terminal to make communications using either the service system or the protection system. If the main terminal makes normal communications using the service system, the part-time terminal will be allowed to make communications using the protection system by selecting the optical transmitting/receiving module for the part-time terminal with the changeover switch in the protection-system low-speed interface unit.

8 Claims, 13 Drawing Sheets

MULTIPLEX TERMINAL STATION APPARATUS

BACKGROUND OF THE INVENTION

1. Field of the Invention

The invention relates to a multiplex terminal station apparatus for use in an optical communications system and, more particularly, to a multiplex terminal station apparatus having a duplex-system configuration to maintain reliability.

2. Description of the Related Art

An optical communications system with high-reliability requirements often uses a duplex-system configuration for optical terminal station apparatuses and transmission links for the purpose of preventing the system from going down due to failures in various pieces of equipment and transmission links used in the system.

When such a duplex-system configuration is used, a conventional system allows the service system (the currently used system) and the protection system to transmit the same information.

However, if the service system is normal, information transmitted by the protection system will be discarded. That is, if the service system is normal, the protection system is not practically used. Thus, the protection system is completely useless as long as the service system is normal.

SUMMARY OF THE INVENTION

It is therefore an object of the invention to provide a multiplex terminal station apparatus which has a duplex-system configuration and permits its protection system to be utilized efficiently when its service system is normal while reliability is maintained without impairing the function of the duplex system.

According to an aspect of the invention there is provided a multiplex terminal station apparatus for multiplexing signals transmitted over low-speed transmission paths for multiplex transmission over a service-system transmission path or a protection-system transmission path, comprising: a plurality of service-system low-speed interface means each of which is adapted to interface with a respective one of the low-speed transmission paths; a plurality of protection-system low-speed interface means each of which is adapted to interface with a respective one of the low-speed transmission paths; at least one part-time transmission path interface means, provided for a part-time transmission path and provided to correspond with one of the protection-system low-speed interfaces, for interfacing with the part-time transmission path; service-system transmission path interface means for interfacing with the service-system transmission path; protection-system transmission path interface means for interfacing with the protection-system transmission path; service-system multiplexing/demultiplexing means for multiplexing a plurality of low-speed signals to be sent over the service-system transmission path to produce a high-speed signal and demultiplexing a high-speed signal received over the service-system transmission path into a plurality of low-speed signals; protection-system multiplexing/demultiplexing means for multiplexing a plurality of low-speed signals to be sent over the protection-system transmission path to produce a high-speed signal and demultiplexing a high-speed signal received over the protection-system transmission path into a plurality of low-speed signals; first selector means for selectively connecting each of the service-system low-speed interface means to either the service-system multiplexing/demultiplexing means or the protection-system multiplexing/demultiplexing means and connecting protection-system low-speed interface means corresponding to service-system low-speed interface means that are connected to the service-system multiplexing/demultiplexing means to the protection-system multiplexing/demultiplexing means; and second selector means for disconnecting the protection-system low-speed interface means corresponding to the service-system low-speed interface means connected to the service-system multiplexing/demultiplexing means by the first selector means from the protection-system multiplexing/demultiplexing means and connecting the part-time transmission path interface means corresponding to the protection-system low-speed interface means to the protection-system multiplexing/demultiplexing means.

According to the other aspect of the invention there is provided a multiplex terminal station apparatus for multiplexing signals transmitted over low-speed transmission paths for multiplex transmission over two service-system transmission paths or two protection-system transmission paths, comprising: a plurality of service-system low-speed interface means each of which is adapted to interface with a respective one of the low-speed transmission paths; a plurality of protection-system low-speed interface means each of which is adapted to interface with a respective one of the low-speed transmission paths; at least one part-time transmission path interface means, provided for at least one part-time transmission path and provided to correspond with one of the protection-system low-speed interfaces, for interfacing with the part-time transmission path; first and second service-system transmission path interface means for interfacing with a corresponding one of the service-system transmission paths; first and second protection-system transmission path interface means for interfacing with a corresponding one of the protection-system transmission paths; first and second service-system multiplexing/demultiplexing means each provided for a corresponding one of the service-system transmission paths for multiplexing a plurality of low-speed signals to be sent over a corresponding one of the service-system transmission paths to produce a high-speed signal and demultiplexing a high-speed signal received over a corresponding one of the service-system transmission paths and a corresponding one of the service-system transmission path interface means into a plurality of low-speed signals; first and second protection-system multiplexing/demultiplexing means each provided for a corresponding one of the protection-system transmission paths for multiplexing a plurality of low-speed signals to be sent over a corresponding of the protection-system transmission paths to produce a high-speed signal and demultiplexing a high-speed signal received over a corresponding one of the corresponding protection-system transmission paths and a corresponding one of the protection-system transmission path interface means into a plurality of low-speed signals; first selector means for selecting each of the service-system low-speed interface means to be connected to either the service-system multiplexing/demultiplexing means or the protection-system multiplexing/demultiplexing means and selecting protection-system low-speed interface means corresponding to service-system low-speed interface means that are selected to be connected to the service-system multiplexing/demultiplexing means to be selected to the protection-system multiplexing/demultiplexing means; second selector means for disconnecting the protection-system low-speed interface means corresponding to the service-system low-speed interface means selected by the first selector means to be connected to the service-system multiplexing/demultiplexing means from the protection-system multiplexing/demultiplexing means and selecting part-time transmission path interface means corresponding to the protection-system low-speed interface means to be connected to the protection-system multiplexing/demultiplexing means; and connection means having a function of connecting the service-system low-speed interface means selected by the first selector means to be connected to the service-system multiplexing/demultiplexing means to the first and second service-system multiplexing/demultiplexing means in a specified manner, a function of connecting the service-system low-speed interface means, the protection-system low-speed interface means and the part-time transmission path interface means selected by the first and second selector means to be selected to the protection-system multiplexing/demultiplexing means to the first and second protection-system multiplexing/demultiplexing means in a specified manner, and a function of connecting the first and second service-system multiplexing/demultiplexing means and the first and second protection-system multiplexing/demultiplexing means in a specified manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
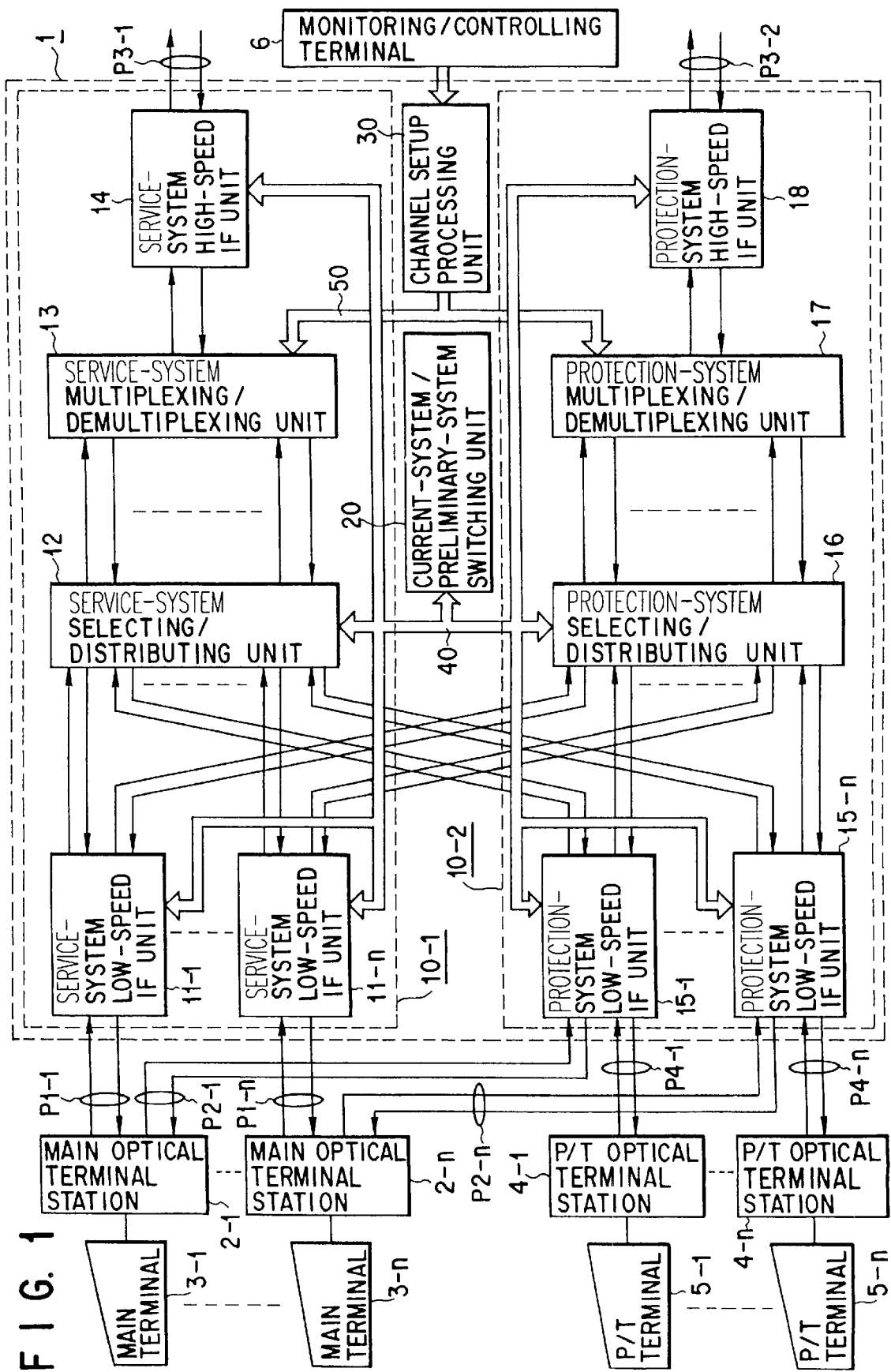
FIG. 1 is a block diagram of an optical multiplex terminal station apparatus according to a first embodiment of the invention.

Referring now to FIG. 1, there is illustrated in block diagram form an optical multiplex terminal station apparatus according to a first embodiment of the invention.

In FIG. 1, an optical multiplex terminal station apparatus, which is indicated at 1, includes a service system 10-1, a protection system 10-2, a service-system/protection-system switching unit 20, and a channel setup processing unit 30.

The optical multiplex terminal station apparatus 1 is formed in a duplex-system configuration and the service system 10-1 and the protection system 10-2 are connected to the other optical multiplex terminal station apparatus not shown through a service-system optical transmission path P3-1 and a protection-system optical transmission path P3-2, respectively. To the multiplex terminal station apparatus 1 are connected n main optical terminal stations 2 (2-1 to 2-n), each formed in duplex-system configuration, by service-system optical transmission paths P1 (P1-1 to P1-n) and protection-system optical transmission paths P2 (P2-1 to P2-n). Each of the optical transmission paths consists of two optical fibers. Main terminals 3 (3-1 to 3-n) are connected to the main optical terminal stations 2 (2-1 to 2-n), respectively.

To the protection system 10-2 of the main optical terminal station 1 are connected part-time optical terminal stations (hereinafter referred to as P/T optical terminal stations) 4 (4-1 to 4-n) by part-time optical transmission paths (hereinafter referred to as P/T transmission paths) P4 (P4-1 to P4-n), respectively. Further, the P/T optical terminal stations 4 are connected to part-time terminals (hereinafter referred to as P/T terminals) 5 (5-1 to 5-n), respectively. Namely, the optical multiplex terminal station apparatus 1 accommodates n channels.

It is to be noted here that, of the two types of terminals (the main terminals 3 and the P/T terminals 5), the main terminals 3 are mainly allowed to make communications through the optical multiplex terminal station apparatus 1. The P/T terminals 5 are adapted to make information communications which will cause no inconvenience even if they are interrupted. For example, such information communications correspond to the case where main information communications are made over another transmission path (another communications network) while the identical information is communicated preliminarily through an optical multiplex terminal station apparatus.

The service system 10-1 includes n service-system low-speed interface (IF) units 11 (11-1 to 11-n), a service-system selecting/distributing unit 12, a service-system multiplexing/demultiplexing unit 13, and a service-system high-speed interface (IF) unit 14.

The protection system 10-2 includes n protection-system low-speed interface (IF) units 15 (15-1 to 15-n), a protection-system selecting/distributing unit 16, a protection-system multiplexing/demultiplexing unit 13, and a protection-system high-speed interface unit 18.

Figure 2:
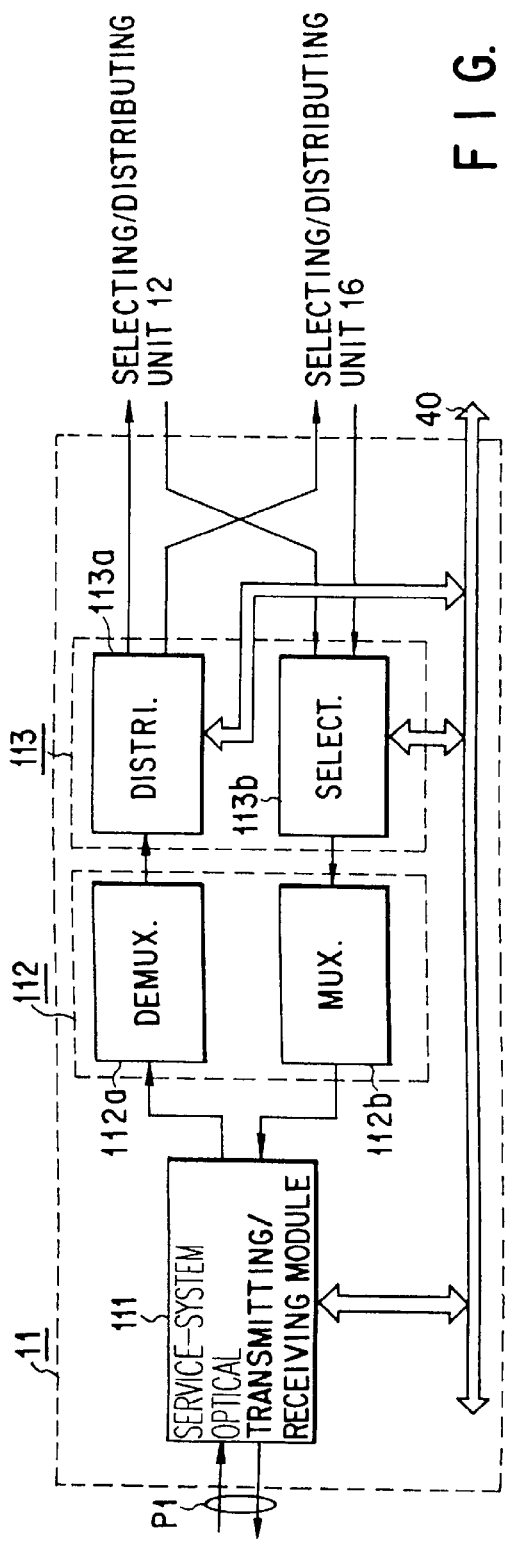
FIG. 2 is a block diagram of the service-system low-speed interface unit shown in FIG. 1.

The service-system low-speed interface unit 11 is adapted to interface with the corresponding main terminal station 2 and, as shown in FIG. 2, includes a service-system optical transmitting/receiving module 111, a termination circuit 112, and a distributing/selecting circuit 113.

The service-system optical transmitting/receiving module 111 converts an optical signal sent over the service-system optical transmission path P1 to an electrical signal for application to the termination circuit 112 and converts an electrical signal from the termination circuit to an optical signal which is, in turn, sent over the optical transmission path P1. The module 111 has a function of monitoring the presence or absence of faults in the optical transmission path P1 and itself. Further, the module 111 is responsive to a request by the service-system/protection-system switching unit 20 to inform it of the results of the fault monitoring via a bus 40.

The termination circuit 112 comprises a demultiplexer 112a and a multiplexer 112b. The demultiplexer 112a performs termination processing, such as pull-in and predetermined signal separation, on a signal from the module 111. The multiplexer 112b performs termination processing, such as predetermined information multiplexing, on a signal from the distributing/selecting circuit 113.

The distributing/selecting circuit 113 comprises a distributor 113a and a selector 113b. The distributor 113a provides a signal from the termination circuit 112 to either of the service-system selecting/distributing unit 12 and the protection-system selecting/distributing unit 16. The selector 113b selects either a signal from the service-system selecting/distributing unit 12 or a signal from the protection-system selecting/distributing unit 16 for application to the terminating circuit 112. The destination of an output of the distributor 113a and a signal to be selected by the selector 113b are specified by the service-system/protection-system switching circuit 20 via the bus 40.

Figure 3:
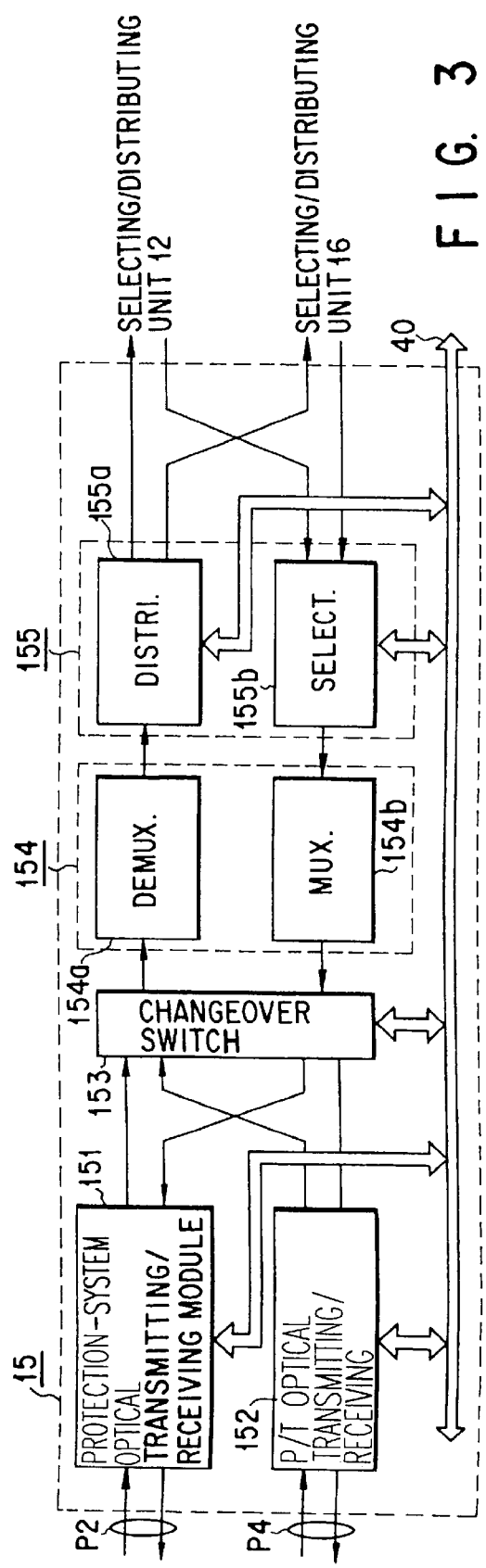
FIG. 3 is a block diagram of the protection-system low-speed interface unit shown in FIG. 1.

On the other hand, the protection-system low-speed interface unit 15 is adapted to interface with the corresponding main terminal station 2 and the corresponding P/T optical terminal station 4 and, as shown in FIG. 3, comprises a protection-system optical transmitting/receiving module 151, a P/T optical transmitting/receiving module 152, a changeover switch circuit 153, a termination circuit 154, and a distributing/selecting circuit 155.

The protection-system optical transmitting/receiving module 151 converts an incoming optical signal sent over the protection-system optical transmission path P2 to an electrical signal for application to the changeover switch circuit 112 and converts an electrical signal from the changeover switch circuit 112 to an optical signal which is, in turn, sent over the optical transmission path P2. The module 151 has a function of monitoring the presence or absence of faults in the optical transmission path P2 and itself. Further, the module 151 is responsive to a request by the service-system/protection-system switching unit 20 to inform it of the results of the fault monitoring via the bus 40.

The P/T optical transmitting/receiving module 152 converts an optical signal sent over the P/T optical transmission path P4 to an electrical signal for application to the changeover switch circuit 153 and converts an electrical signal from the changeover switch circuit to an optical signal which is, in turn, sent over the P/T optical transmission path P4. The module 152 has a function of monitoring the presence or absence of faults in the optical transmission path P4 and itself. Further, the module 152 informs the service-system/protection-system switching unit 20 of the results of the fault monitoring via the bus 40 as requested by it.

The changeover switch circuit 153 connects either the protection-system optical transmitting/receiving module 151 or the P/T optical transmitting/receiving module 152 to the termination circuit 154. Which of the modules 152 and 154 is to be connected to the termination circuit 154 is specified by the service-system/protection-system switching unit 20 via the bus 40.

The termination circuit 154 comprises a demultiplexer 154a and a multiplexer 154b. The demultiplexer 154a performs termination processing, such as pull-in and signal separation, on a signal from the changeover switch circuit 153. The multiplexer 154b performs termination processing, such as information multiplexing, on a signal from the distributing/selecting circuit 155.

The distributing/selecting circuit 155 comprises a distributor 155a and a selector 155b. The distributor 155a provides a signal from the termination circuit 154 to either of the service-system selecting/distributing unit 12 and the protection-system selecting/distributing unit 16. The selector 155b selects either a signal from the service-system selecting/distributing unit 12 or a signal from the protection-system selecting/distributing unit 16 for application to the termination circuit 154. The destination of an output of the distributor 155a and a signal to be selected by the selector 155b are specified by the service-system/protection-system switching circuit 20 via the bus 40.

Referring back to FIG. 1, the service-system selecting/distributing unit 12 connects either the service-system low-speed interface units 11 or the protection-system low-speed interface units 15 to the service-system multiplexing/demultiplexing unit 13.

The protection-system selecting/distributing unit 16 connects either the service-system low-speed interface units 11 or the protection-system low-speed interface units 15 to the protection-system multiplexing/demultiplexing unit 17.

When connected with the service-system low-speed interface units 11 by the service-system selecting/distributing unit 12, the service-system multiplexing/demultiplexing unit 13 multiplexes output signals of the respective interface units 11 into a multiplexed signal for application to the service-system high-speed interface unit 14 and separates a multiplexed signal from the high-speed interface unit 14 into n signal components each of which is, in turn, applied to a corresponding respective one of the service-system low-speed interface units 11. On the other hand, when connected with the protection-system low-speed interface units 15 by the service-system selecting/distributing unit 12, the service-system multiplexing/demultiplexing unit 13 multiplexes output signals of the respective interface units 15 into a multiplexed signal for application to the service-system high-speed interface unit 14 and separates a multiplexed signal from the high-speed interface unit 14 into n signal components each of which is, in turn, applied to a corresponding respective one of the protection-system low-speed interface units 15.

When connected with the service-system low-speed interface units 11 by the protection-system selecting/distributing unit 16, the protection-system multiplexing/demultiplexing unit 17 multiplexes output signals of the respective interface units 11 into a multiplexed signal for application to the protection-system high-speed interface unit 18 and separates a multiplexed signal from the high-speed interface unit 18 into n signal components each of which is, in turn, applied to a corresponding respective one of the service-system low-speed interface units 11. On the other hand, when connected with the protection-system low-speed interface units 15 by the protection-system selecting/distributing unit 16, the protection-system multiplexing/demultiplexing unit 17 multiplexes output signals of the respective interface units 15 into a multiplexed signal for application to the protection-system high-speed interface unit 18 and separates a multiplexed signal from the high-speed interface unit 18 into n signal components each of which is, in turn, sent to a corresponding respective one of the protection-system low-speed interface units 15.

The service-system high-speed interface unit 14 is adapted to interface with the service-system optical transmission path P3-1 and has a function of monitoring the presence or absence of faults in the optical transmission path P3-1 and itself. Further, the interface unit 14 informs the service-system/protection-system switching unit 20 of the results of the fault monitoring through the bus 40 as requested by it.

The protection-system high-speed interface unit 18 is adapted to interface with the protection-system optical transmission path P3-2 and has a function of monitoring the presence or absence of faults in the optical transmission path P3-2 and itself. Further, the interface unit 18 is responsive to a request made by the service-system/protection-system switching unit 20 to inform it of the results of the fault monitoring through the bus 40.

The service-system/protection-system switching unit 20 is connected by the bus 40 to the service-system low-speed interface unit 11, the service-system selecting/distributing 12, the service-system high-speed interface unit 14, the protection-system low-speed interface unit 15, the protection-system selecting/distributing unit 16, and the protection-system high-speed interface unit 18. The service-system/protection-system switching unit 20 takes in the results of monitoring by the service-system optical transmitting/receiving module 111, the protection-system optical transmitting/receiving module 151, the P/T optical transmitting/receiving module 152, the service-system high-speed interface unit 14, and the protection-system high-speed interface unit 18 to monitor the fault-occurring conditions. The switching unit 20 controls the distributing/selecting circuit 113 in the service-system low-speed interface unit 11, the service-system selecting/distributing unit 12, the changeover switch 153 and the distributing/selecting circuit 155 in the protection-system low-speed interface unit 15, and the protection-system selecting/distributing unit 16 so as to set up suitable communications paths.

The channel setup unit 30 controls the service-system multiplexing/demultiplexing unit 13 and the protection-system multiplexing/demultiplexing unit 17 so that such a relationship as specified by the monitoring/controlling terminal 6 is established between a number of channels of signals sent over the service-system optical transmission paths P3-1 or the protection-system optical transmission paths P3-2 and the n low-speed signals.

Figure 4:
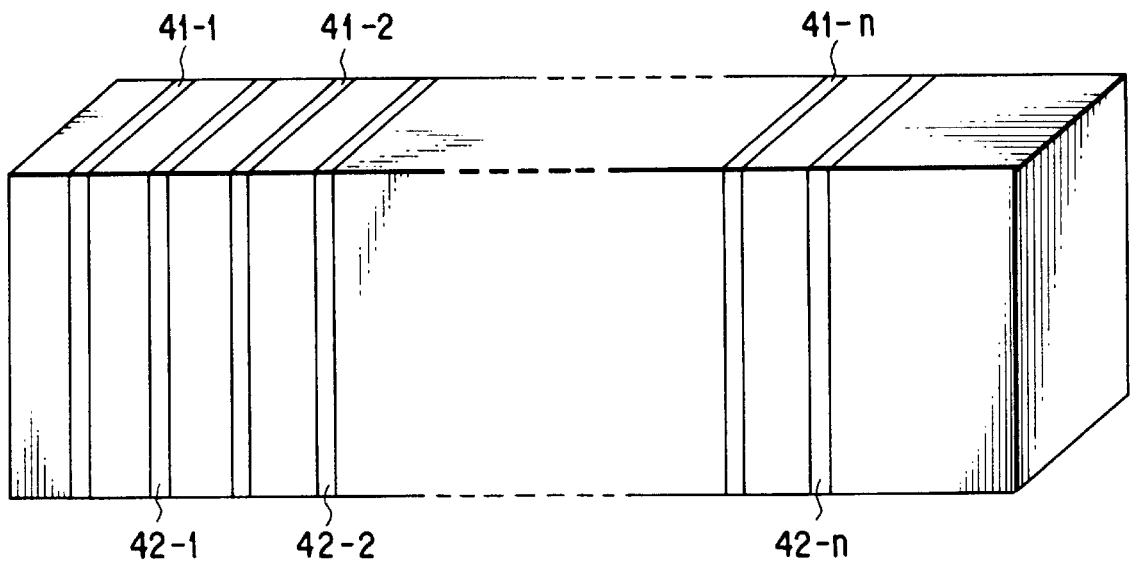
FIG. 4 is an exterior view of the optical multiplex terminal station apparatus shown in FIG. 1.
Figure 5:
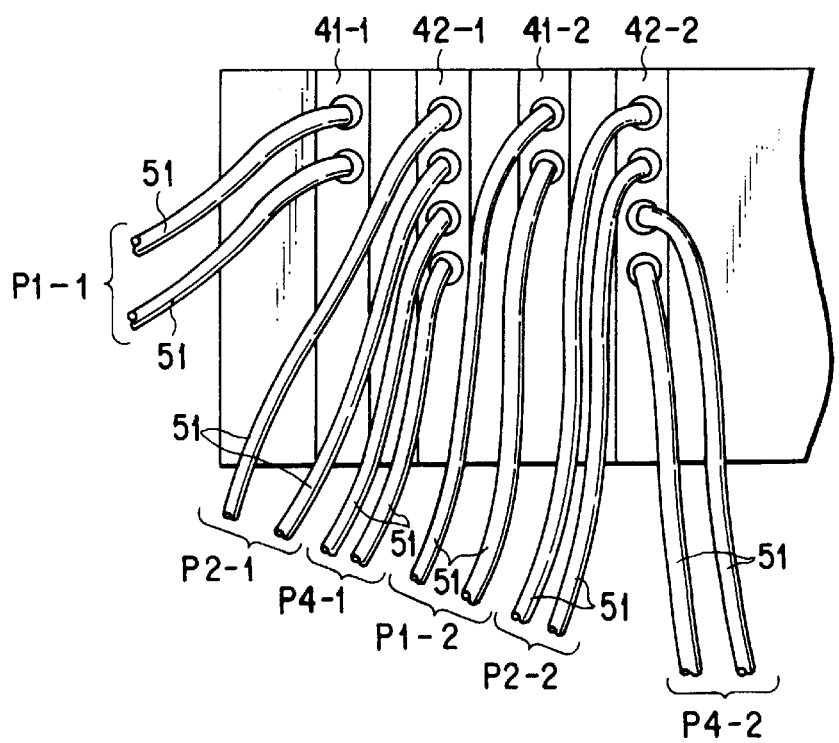
FIG. 5 is a perspective rear view of the optical multiplex terminal station apparatus shown in FIG. 1.

FIGS. 4 and 5 show exterior views of the optical multiplex terminal station apparatus 1. More specifically, FIG. 4 is a perspective view of and FIG. 5 shows the rear of the terminal station 1. In these figure, 41 (41-1 to 41-n) denotes service-system low-speed interface panels in which the service-system low-speed interface units 11 (11-1 to 11-n) are packaged and 42 (42-1 to 42-n) denotes protection-system low-speed interface panels in which the protection-system low-speed interface units 15 (15-1 to 15-n) are packaged. The service-system and protection-system low-speed interface panels are arranged alternately so that the service-system and protection-system low-speed interface units corresponding in channel to each other are placed adjacent to each other.

Further, 51 denotes an optical fiber. Each of the service-system low-speed interface panels 41 is connected with two optical fibers as the service-system optical transmission path P1, and each of the protection-system low-speed interface panels 42 is connected with a total of four optical fibers comprising two as the protection-system optical transmission path P2 and two as the P/T optical transmission path P4.

Hereinafter, the operation of the optical multiplexing terminal station 1 thus constructed will be described.

Output signals of the respective main terminals 3 are entered by the corresponding main terminal stations 2 into the optical multiplexing terminal station 1 over the service-system optical transmission paths P1 or the protection-system optical transmission paths P2 and multiplexed together. A multiplexed signal produced by the multiplexing terminal station 1 is sent to another optical multiplexing terminal station not shown over the service-system optical transmission path P3-1 or the protection-system optical transmission path P3-2.

A multiplexed signal received over the service-system optical transmission path P3-1 or the protection-system optical transmission path P3-2 is separated by the optical multiplex terminal station apparatus 1 into n signal components each of which is, in turn, applied to the corresponding main terminal 3 through the corresponding service-system or protection-system optical transmission path P1 or P2 and the corresponding main terminal station 2.

Figure 6:
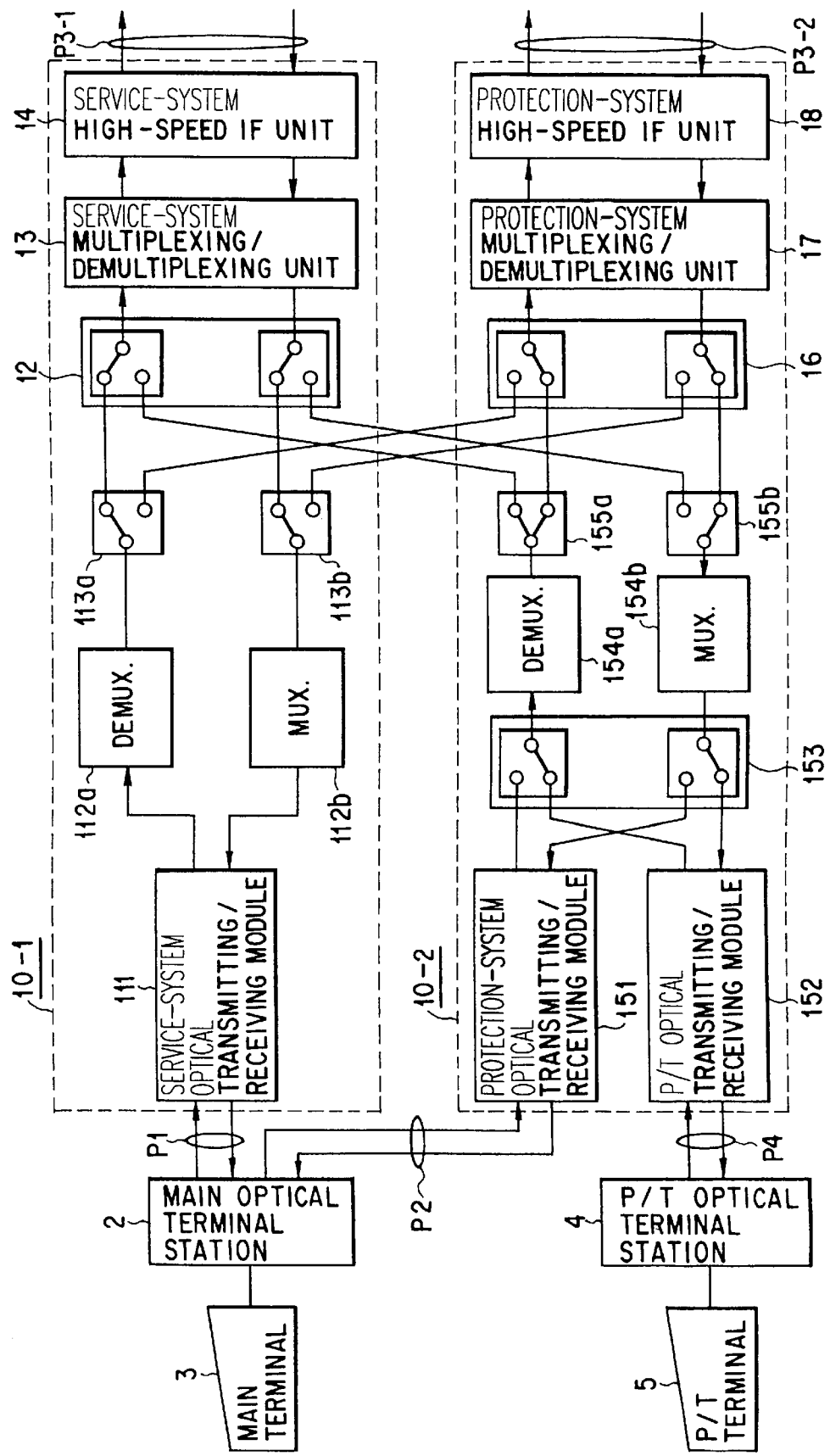
FIG. 6 is a connection diagram of various components for one channel of n channels accommodated by the optical multiplex terminal station apparatus when the service system or service system optical transmission path of FIG. 1 is normal.

When the service system 10-1 in the multiplexing terminal station 1 and the service-system optical transmission path P3-1 are both normal, the service-system/protection-system switching unit 20 controls the distributing/selecting circuits 113 in the service-system low-speed interface units 11 so as to select the service-system selecting/distributing unit 12. In addition, the switching unit 20 controls the service-system selecting/distributing unit 12 so that the service-system low-speed interface units 11 are connected to the service-system multiplexing/demultiplexing unit 12. Thus, in this state, various components corresponding to one of the n channels accommodated by the multiplexing terminal station 1 are connected as shown in FIG. 6.

An output signal of the main terminal 3 is converted by the main terminal station 2 into an optical signal to be sent over the service-system optical transmission path P1 and the protection-system optical transmission path P2. The optical signal sent to the service system 10-1 over the optical transmission path P1 is received by the optical transmitting/receiving module 111 and converted into an electrical signal, which is, in turn, subjected to termination processing in the demultiplexer 112a. After being subjected to the termination processing, the signal is applied through the distributor 113a and the service-system selecting/distributing unit 12 to the service-system multiplexing/demultiplexing unit 13 where it is combined (multiplexed) with the other channels (the outputs of the other service-system low-speed interface units). The multiplexed signal produced by the service-system multiplexing/demultiplexing unit 13 is converted by the service-system high-speed interface unit 14 into an optical signal which is sent over the service-system optical transmission path P3-1.

On the other hand, a multiplexed signal sent over the service-system optical transmission path P3-1 is received by the service-system high-speed interface unit 14 and then applied to the service-system multiplexing/demultiplexing unit 13 where it is separated into n signal components each of which is sent to a corresponding one of the service-system low-speed interface units 11. Each signal output from the service-system multiplexing/demultiplexing unit 13 is sent via the service-system selecting/distributing unit 12 and the selector 113b to the multiplexer 112b where it is subjected to predetermined termination processing. The signal is then converted by the service-system optical transmitting/receiving module 111 into an optical signal which is sent over the service-system optical transmission path P1 to the main optical terminal station 2 and the main terminal 3.

In the above state, the main terminal 3 is thus allowed to make normal communications over the service system 10-1 and the service-system optical transmission path P3-1.

In the above state in which the main terminal 3 is allowed to make communications over the service system 10-1 and the service-system optical transmission path P3-1, the protection system 10-2 and the protection-system optical transmission path are not used for the main terminal 3 to make communications. At this point, in the protection system 10-2, the distributing/selecting circuit 113 in the service-system low-speed interface unit 11 selects the service-system selecting/distributing unit 12 and the service-system selecting/distributing unit 12 connects the service-system low-speed interface unit 11 and the service-system multiplexing/demultiplexing unit 13 together, thus separating the service system 10-1 and the protection system 10-2 from each other. Further, it is not required for the main terminal 3 to make communications over the protection system 10-2 and the protection-system optical transmission path P3-2.

Thus, by controlling the changeover switch 153 in the protection-system low-speed interface unit 15 so as to select the P/T optical transmitting/receiving module 152, the service-system/protection-system switching unit 20 separates the main terminal station 2 and the protection system 10-2 from each other and instead connects the P/T optical terminal station 4 to the protection system. Further, the switching unit 20 controls the protection-system selecting/distributing unit 16 so as to connect the protection-system low-speed interface unit 15 and the protection-system multiplexing/demultiplexing unit 17 together.

In this state, an output signal of the P/T terminal 5 is converted by the P/T optical terminal station 4 into an optical signal which is, in turn, sent over the P/T optical transmission path P4. The optical signal that arrives at the protection system 10-2 in the optical multiplex terminal station apparatus 1 over the P/T optical transmission path P4 is received and converted into an electrical signal by the P/T optical transmitting/receiving module 152. The electrical signal is applied through the changeover switch 153 to the demultiplexer 154a where it is subjected to the termination processing. After that, the signal is applied through the distributor 155a and the protection-system selecting/distributing unit 16 to the protection-system multiplexing/demultiplexing 17 where it is combined with other channels (outputs of the protection-system low-speed interface units 15). A multiplexed signal produced by the protection-system multiplexing/demultiplexing unit 17 is converted by the protection-system high-speed interface unit 18 into an optical signal which is sent over the protection-system optical transmission path P3-2.

On the other hand, a multiplexed signal transferred over the protection-system optical transmission path P3-2 is received and converted by the protection-system high-speed interface unit 18 into an electrical signal which is, in turn, applied to the protection-system multiplexing/demultiplexing unit 17. In the unit 17, the multiplexed signal is separated into n signal components corresponding to the n channels which are output toward the corresponding protection-system low-speed interface units 15. Each signal output from the multiplexing/demultiplexing unit 17 is applied through the protection-system selecting/distributing unit 16 and the selector 155b to the multiplexer 154b where it is subjected to the predetermined termination processing. The signal is then applied through the changeover switch 153 to the P/T optical transmitting/receiving module 152 where it is converted to an optical signal which is sent over the P/T optical transmission path P4. The optical signal is received by the P/T optical terminal station 4 and then applied to the P/T terminal 5.

Thus, the P/T terminal 5 is allowed to make communications through the use of the protection system 10-2 and the protection-system optical transmission path P3-2 which are on standby for communications made by the main terminal 3.

Figure 7:
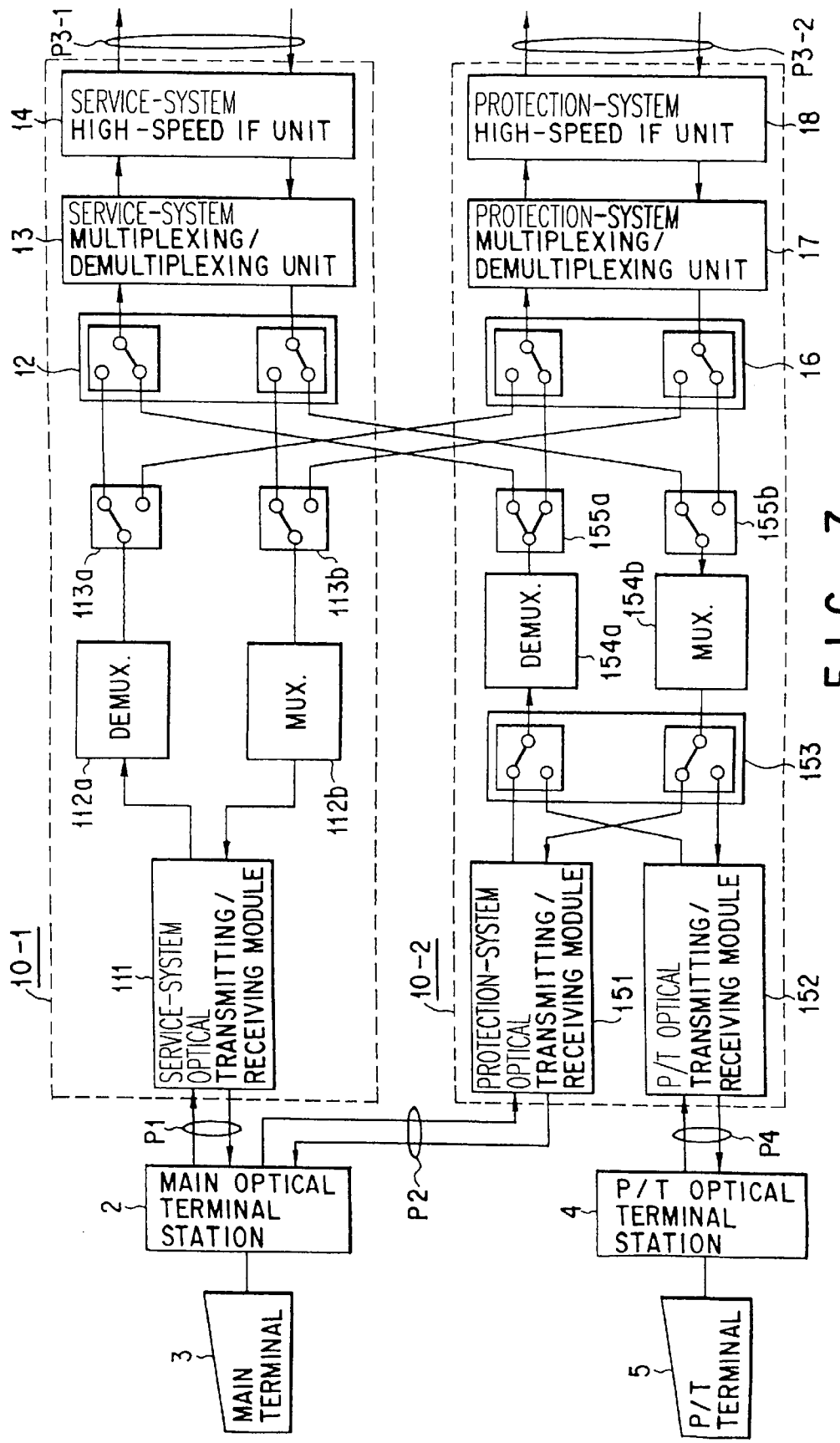
FIG. 7 is a connection diagram of various components for one channel of the n channels accommodated by the optical multiplex terminal station apparatus in the event of a failure in that part of the main optical terminal station which corresponds to the transmission path, the service-system optical transmission path, or service-system low-speed interface unit in the optical multiplex station terminal of FIG. 1.

When a fault occurs in that part of the main optical terminal station which corresponds to the transmission path P1, the service-system optical transmission path P1, or the service-system low-speed interface unit 11 in the service system 10-1, the service-system/protection-system switching unit 20 controls the service-system selecting/distributing unit 12 so that the protection-system low-speed interface unit 15 is connected to the service-system multiplexing/demultiplexing unit 13. The switching unit 20 also controls the changeover switch 153 in the protection-system low-speed interface unit 15 so as to select the protection-system optical transmitting/receiving module 151. Further, the switching unit 20 controls the distributing/selecting circuit 155 so as to select the service-system selecting/distributing unit 12. In this state, various components corresponding to one of the n channels accommodated by the optical multiplexing terminal station 1 are connected as shown in FIG. 7.

In this state, an output signal of the main terminal 3 is converted by the main optical terminal station 2 into an optical signal which is sent over both the service-system optical transmission path P1 and the protection-system optical transmission path P2. The optical signal that arrives at the protection system 10-2 over the protection-system optical transmission path P2 is received and converted by the protection-system optical transmitting/receiving module 151 into an electrical signal. The electrical signal is applied through the changeover switch 153 to the separation circuit 154a where it is subjected to the predetermined termination processing. The signal is then applied through the distributor 155a and the service-system selecting/distributing unit 12 to the service-system multiplexing/demultiplexing unit 13 where it is combined with the other channels (outputs of the other service-system low-speed interface units 11). A multiplexed signal produced by the multiplexing/demultiplexing unit 13 is output through the service-system high-speed interface unit 14 onto the service-system optical transmission path P3-1 in the form of an optical signal.

On the other hand, a multiplexed signal transferred over the service-system optical transmission path P3-1 is received and converted by the service-system high-speed interface unit 14 into an electrical signal which is, in turn, applied to the service-system multiplexing/demultiplexing unit 13. In the unit 13, the multiplexed signal is separated into n signal components corresponding to the n channels which are output toward the corresponding protection-system low-speed interface units 15. Each signal output from the multiplexing/demultiplexing unit 13 is applied through the service-system selecting/distributing unit 12 and the selector 155b to the multiplexer 154b where it is subjected to the predetermined termination processing. The signal is then applied through the changeover switch 153 to the service-system optical transmitting/receiving module 111 where it is converted to an optical signal which is sent over the protection-system transmission path P2. The optical signal is received by the main optical terminal station 2 and then applied to the main terminal 3.

Thus, the main terminal 3 is allowed to make communications normally via the service-system optical transmission path P3-1 while bypassing the faulty part in the service system using a part of the protection system. In this case, the P/T terminal 5 is disconnected by the changeover switch 153 and hence cannot make communications via either of the service-system optical transmission path P3-1 and the protection-system optical transmission path P3-2.

Figure 8:
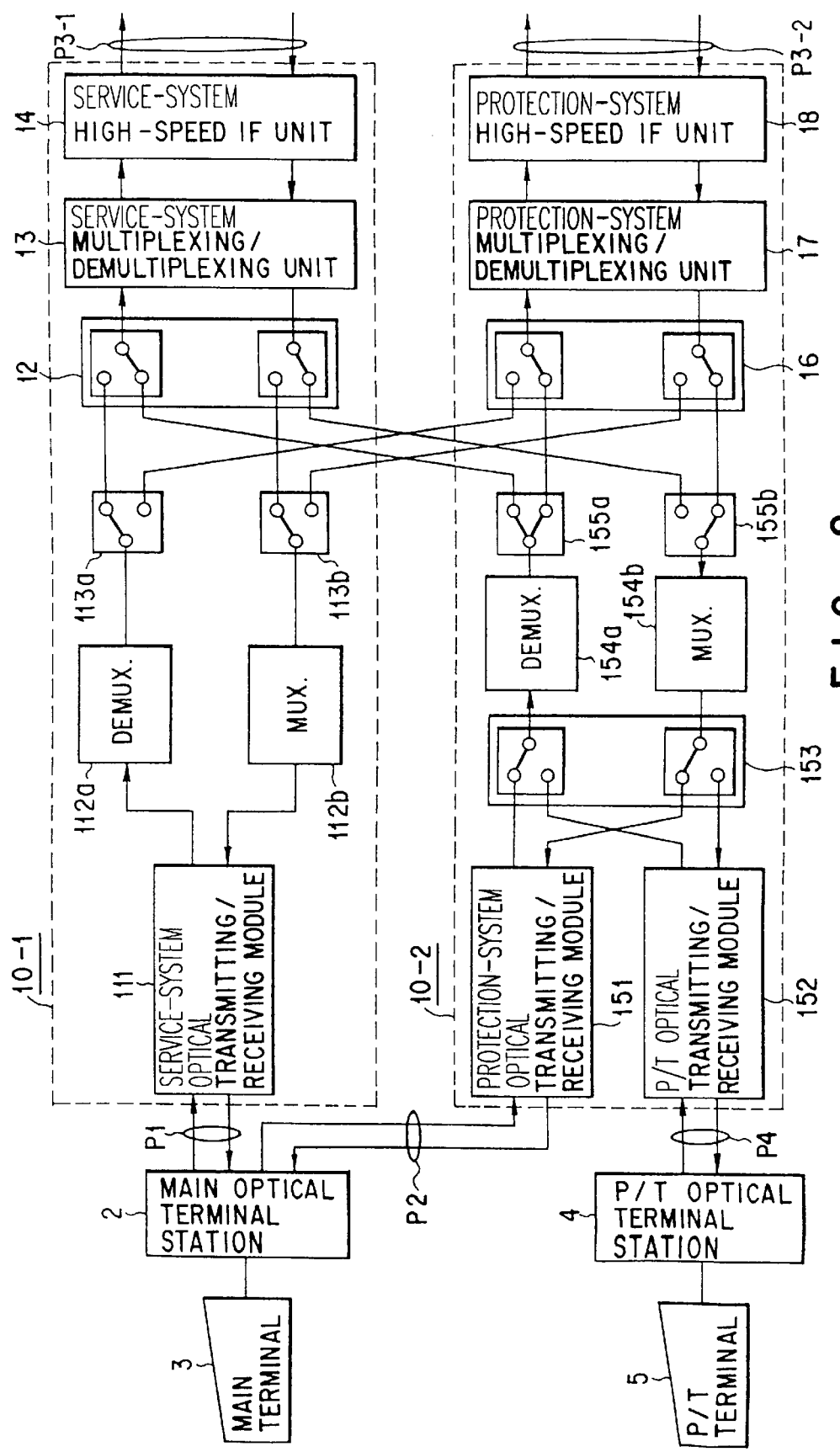
FIG. 8 is a connection diagram of various components for one channel of the n channels accommodated by the optical multiplex terminal station apparatus of FIG. 1 in the event of a failure in the service-system selecting/distributing unit, the service-system multiplexing/demultiplexing unit, the service-system high-speed interface unit, or the service-system optical transmission path.

When a fault occurs in the service-system selecting/distributing unit 12, the service-system multiplexing/demultiplexing unit 13, the service-system high-speed interface unit 11, or the service-system optical transmission path P3-1, the service-system/protection-system switching unit 20 controls the changeover switch 153 in the protection-system low-speed interface unit 15 so as to select the protection-system optical transmitting/receiving module 151. The switching unit 20 also controls the distributing/selecting circuit 155 so as to select the protection-system selecting/distributing unit 16. Further, the switching unit 20 also controls the protection-system selecting/distributing unit 16 so as to select the distributing/selecting circuit 155. In this state, various components corresponding to one of the n channels accommodated by the optical multiplexing terminal station 1 are connected as shown in FIG. 8.

In this state, an output signal of the main terminal 3 is converted by the main optical terminal station 2 into an optical signal which, in turn, is sent over both the service-system optical transmission path P1 and the protection-system optical transmission path P2. The optical signal that arrives at the protection system 10-2 over the protection-system optical transmission path P2 is received and converted by the protection-system optical transmitting/receiving module 151 into an electrical signal. The electrical signal is applied through the changeover switch 153 to the demultiplexer 154a where it is subjected to the predetermined termination processing. The signal is then applied through the distributor 155a and the protection-system selecting/distributing unit 16 to the protection-system multiplexing/demultiplexing unit 17 where it is combined with the other channels (outputs of the other protection-system low-speed interface units 11). A multiplexed signal thus produced by the multiplexing/demultiplexing unit 17 is output through the protection-system high-speed interface unit 18 onto the protection-system optical transmission path P3-2 in the form of an optical signal.

On the other hand, a multiplexed signal sent over the protection-system optical transmission path P3-2 is received and converted by the protection-system high-speed interface unit 18 into an electrical signal which is, in turn, applied to the protection-system multiplexing/demultiplexing unit 17. In the unit 17, the multiplexed signal is separated into n signal components corresponding to the n channels which are output toward the corresponding protection-system low-speed interface units 15. Each signal output from the multiplexing/demultiplexing unit 17 is applied through the protection-system selecting/distributing unit 16 and the selector 155b to the multiplexer 154b where it is subjected to the predetermined termination processing. The signal is then applied to the protection-system optical transmitting/receiving module 151 where it is converted to an optical signal which is sent over the protection-system transmission path P2. The optical signal is received by the main optical terminal station 2 and then applied to the main terminal 3.

Thus, the main terminal 3 is allowed to make communications normally via the protection system 10-2 and the protection-system optical transmission path P3-2. In this case as well, the P/T terminal 5 is disconnected from the service system and the protection system by the changeover switch 153 and hence cannot make communications via either of the service-system optical transmission path P3-1 and the protection-system optical transmission path P3-2.

As described above, according to the present embodiment, when a fault occurs in any part of the service system, a normal path for communications made by the main terminal 3 can be set up by using a part or the whole of the protection system to bypass the faulty part in the service system, maintaining the reliability of the duplex configuration.

In the absence of any fault in the service system, the protection system that is not used for communications by the main terminal 3 can be used for communications by the P/T terminal 5 other than the main terminal 3, providing efficient utilization of the protection system 10-2 and the protection-system optical transmission path P3-2. And moreover, in the present embodiment, the termination circuit 154, the distributing/selecting circuit 155, the protection-system selecting/distributing unit 16, the protection-system multiplexing/demultiplexing unit 17 and the protection-system high-speed interface unit 18 are used in common to communications by the main terminal 3 and the P/T terminal 5, which will restrain an increase in the complication of the configuration to a minimum.

In the configuration of the first embodiment, if the P/T terminal 5 is making communications using the protection system, then no optical signal will be sent over the protection-system optical transmission path P2 because the protection-system optical transmitting/receiving module 151 is disconnected from the protection-system demultiplexing/multiplexing circuit 154.

For this reason, if the optical terminal 2 is adapted to monitor input interruptions, then it will be placed in the fault detected state in such a case as described above. In the fault detected state, an input interruption warning is issued.

Hereinafter, a second embodiment of the invention will be described which is adapted to circumvent the difficulty as described above.

Figure 9:
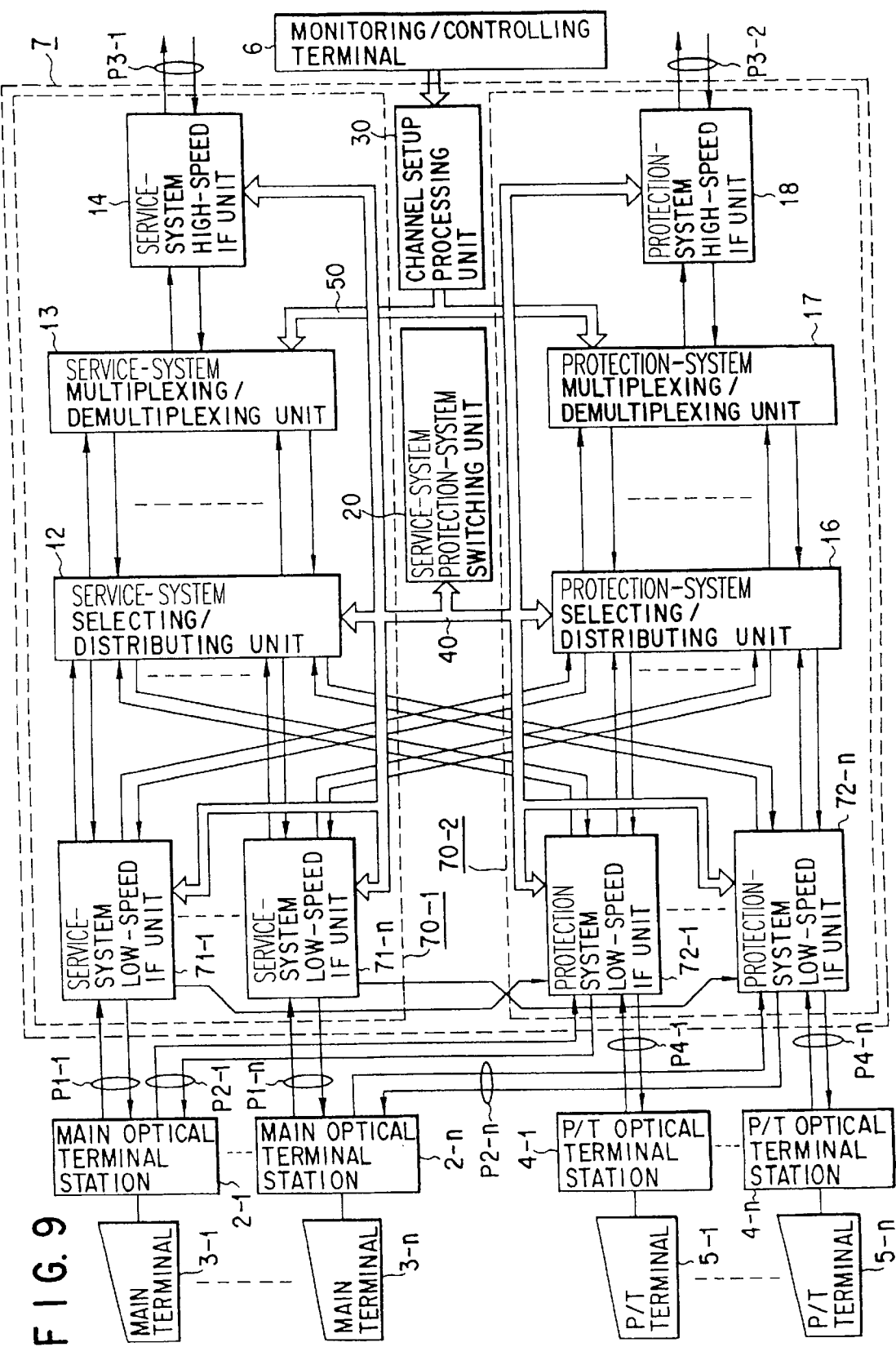
FIG. 9 is a block diagram of an optical multiplex station terminal according to a second embodiment of the invention.

FIG. 9 is a block diagram of an optical multiplex terminal station apparatus according to the second embodiment and, in this figure, like reference numerals are used to denote corresponding parts to those in FIG. 1.

In FIG. 9, reference numeral 7 denotes an optical multiplex terminal station apparatus, which includes a service system 70-1, a protection system 70-2, a service-system/protection-system switching unit 20, and a channel setup unit 30.

In the terminal station 7 of the present embodiment, the service system 10-1 and the protection system 10-2 in the terminal station 1 of the first embodiment are replaced with the service system 70-1 and the protection system 70-2, respectively.

The service system 70-1 includes n service-system low-speed interface units 71, a service-system selecting/distributing unit 12, a service-system multiplexing/demultiplexing unit 13, and a service-system high-speed interface unit 14.

The protection system 70-2 includes n protection-system low-speed interface units 72 (72-1 to 72-n), a protection-system selecting/distributing unit 16, a protection-system multiplexing/demultiplexing unit 17, and a protection-system high-speed interface unit 18.

The service-system low-speed interface unit 71 is adapted to interface with the main optical terminal station 2, while the protection-system low-speed interface unit 72 is adapted to interface with the main optical terminal station 2 and the P/T optical terminal station 4.

Figure 10:
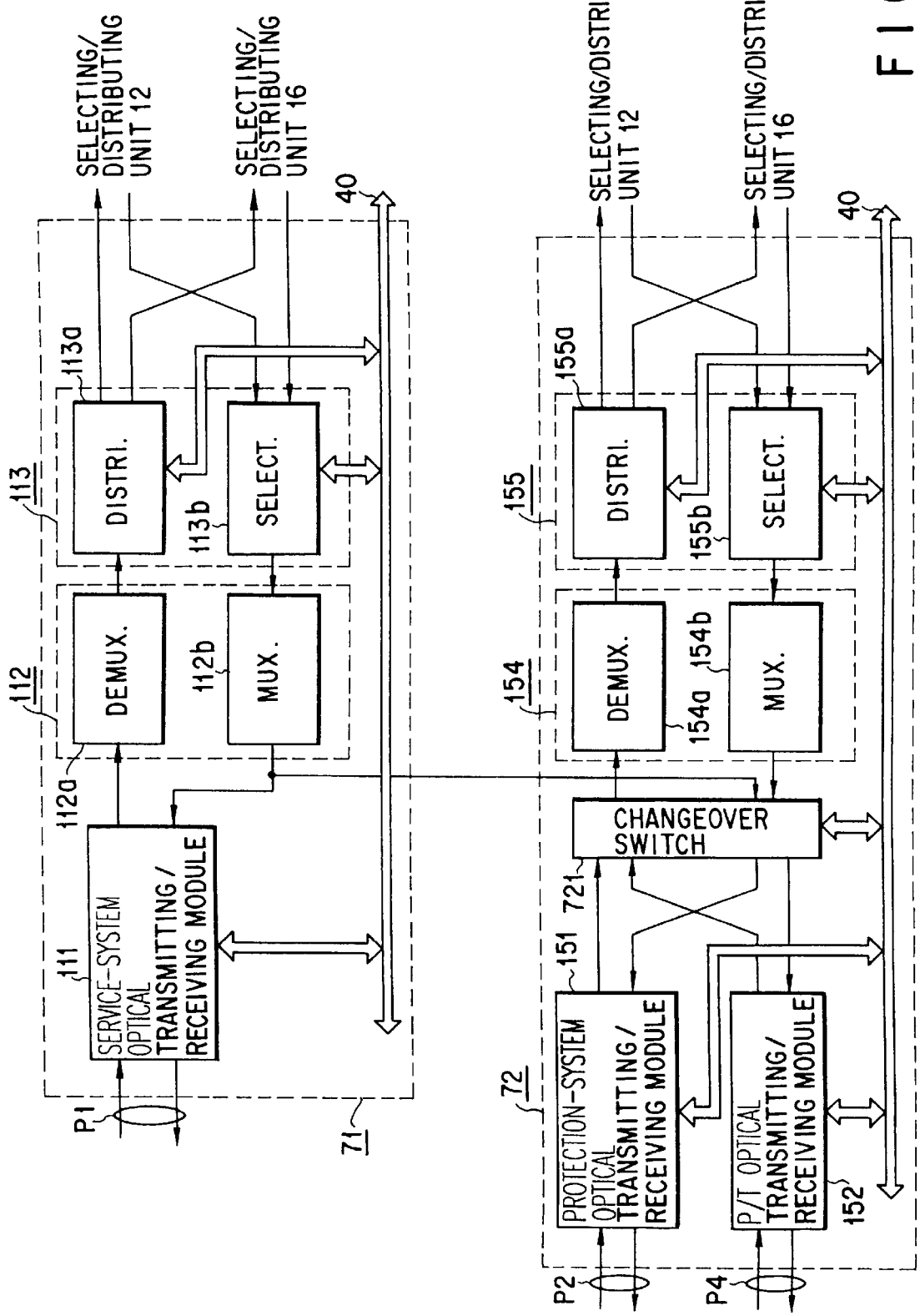
FIG. 10 shows in block diagram form the service-system interface unit and the protection-system low-speed interface unit of FIG. 9.

As shown in FIG. 10, the service-system low-speed interface unit 71 includes a service-system optical transmitting/receiving module 111, a termination circuit 112, and a distributing/selecting circuit 113.

The service-system low-speed interface unit 71 is substantially the same as the corresponding interface unit 11 in the first embodiment, but differs from it in that a signal which has been subjected to termination processing in a multiplexer 112b is applied to the protection-system low-speed interface unit 72.

On the other hand, as shown in FIG. 10, the protection-system low-speed interface unit 72 includes a protection-system optical transmitting/receiving module 151, a P/T optical transmitting/receiving module 152, a termination circuit 154, a distributing/selecting circuit 155, and a changeover switch circuit 721. That is, the interface unit 72 is substantially the same as the corresponding interface unit 15 in the first embodiment, but differs from it in that, instead of the changeover switch 153, the changeover switch 721 is provided to receive a signal from the service-system low-speed interface unit 71.

The changeover switch 721 connects either of the protection-system optical transmitting/receiving module 151 and the P/T optical transmitting/receiving module 152 to the termination circuit 154 and controls the application of a signal from the service-system low-speed interface unit 71 to the protection-system optical transmitting/receiving module 151. The state of the changeover switch 721 is specified by the service-system/protection-system switching unit 20 through the bus 40.

Next, the operation of the optical multiplex terminal station apparatus 7 thus constructed will be described. First, the station 7 basically operates identically to the optical multiplexing terminal station 1 in the first embodiment and allows the terminals 3 and 5 to make communications.

Figure 11:
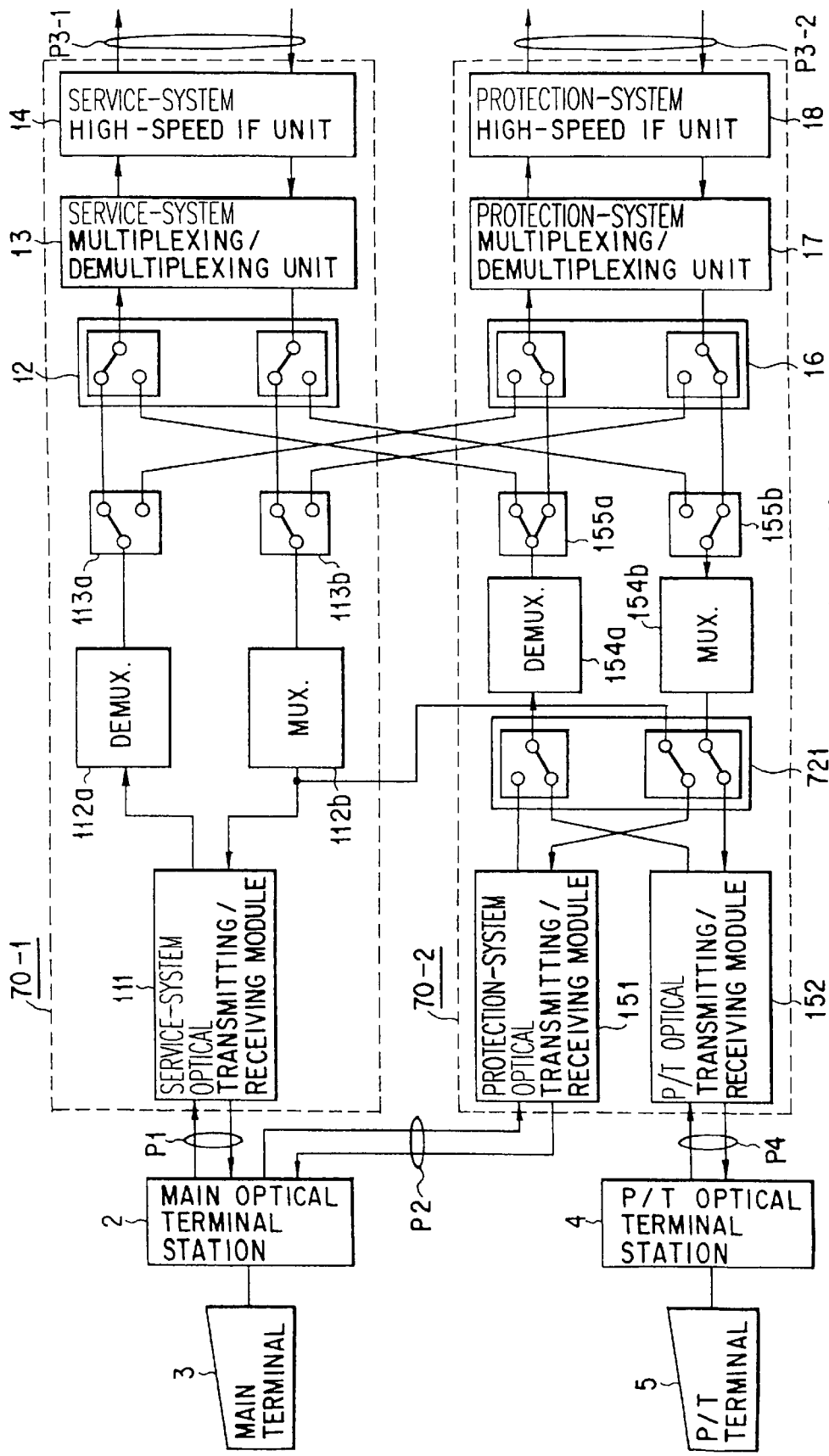
FIG. 11 is a connection diagram of various components for one channel of n channels accommodated by the multiplex terminal station apparatus when the service-system and the service-system optical transmission path of FIG. 9 are normal.

When the service system 70-1 and the service-system optical transmission path P3-1 are both normal, the service-system/protection-system switching unit 20 selects the P/T optical transmitting/receiving module 152 and controls the changeover switch 721 in the protection-system low-speed interface unit 72 to allow a signal from the service-system low-speed interface unit 71 to be applied to the protection-system optical transmitting/receiving module 151. In this state, various components corresponding to one of the n channels accommodated by the optical multiplexing terminal station 7 are connected as shown in FIG. 11.

In this state, a signal subjected to the termination processing in the multiplexer 112b is applied to the protection-system optical transmitting/receiving module 151 via the changeover switch 721 where it is converted into an optical signal and then sent over the protection-system optical transmission path P2. The optical signal sent over the optical transmission path P2 is received by the main optical terminal station 2.

In this way, a signal which is the same as a signal that is transferred to the main optical terminal station 2 via the service-system optical transmitting/receiving module 111 and the service-system optical transmission path P1 is routed to the protection-system low-speed interface unit 72 for transfer to the main terminal station 2 via the protection-system optical transmitting/receiving module 151 and the protection-system optical transmission path P2.

Figure 12:
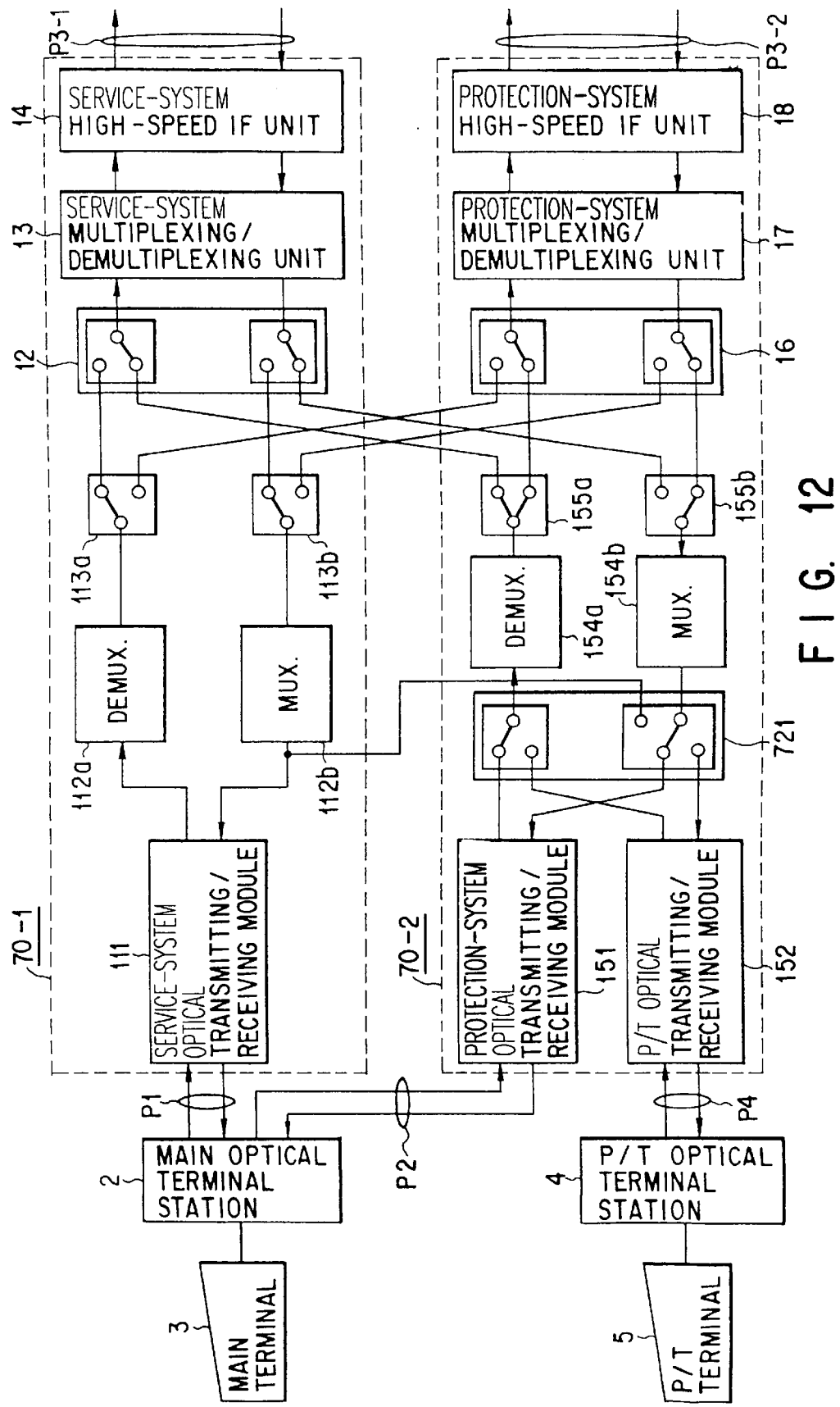
FIG. 12 is a connection diagram of various components for one channel of the n channels accommodated by the optical multiplex terminal station apparatus of FIG. 9 in the event of a failure in that part of the main optical terminal station which corresponds to the transmission path, the service-system optical transmission path, or service-system low-speed interface unit in the optical multiplex station terminal.

When a fault occurs in that part of the main optical terminal station which corresponds to the transmission path P1, the service-system optical transmission path P1, or the service-system low-speed interface unit 71 in the service system 70-1, the service-system/protection-system switching unit 20 controls the changeover switch 721 in the protection-system low-speed interface unit 72 so as to select the protection-system optical transmitting/receiving module 151. The switching unit 20 also controls the changeover switch 721 so as to stop the application of a signal from the service-system low-speed interface unit 71 to the protection-system optical transmitting/receiving module 151. In this state, various components corresponding to one of the n channels accommodated by the optical multiplex terminal station apparatus 7 are connected as shown in FIG. 12.

Figure 13:
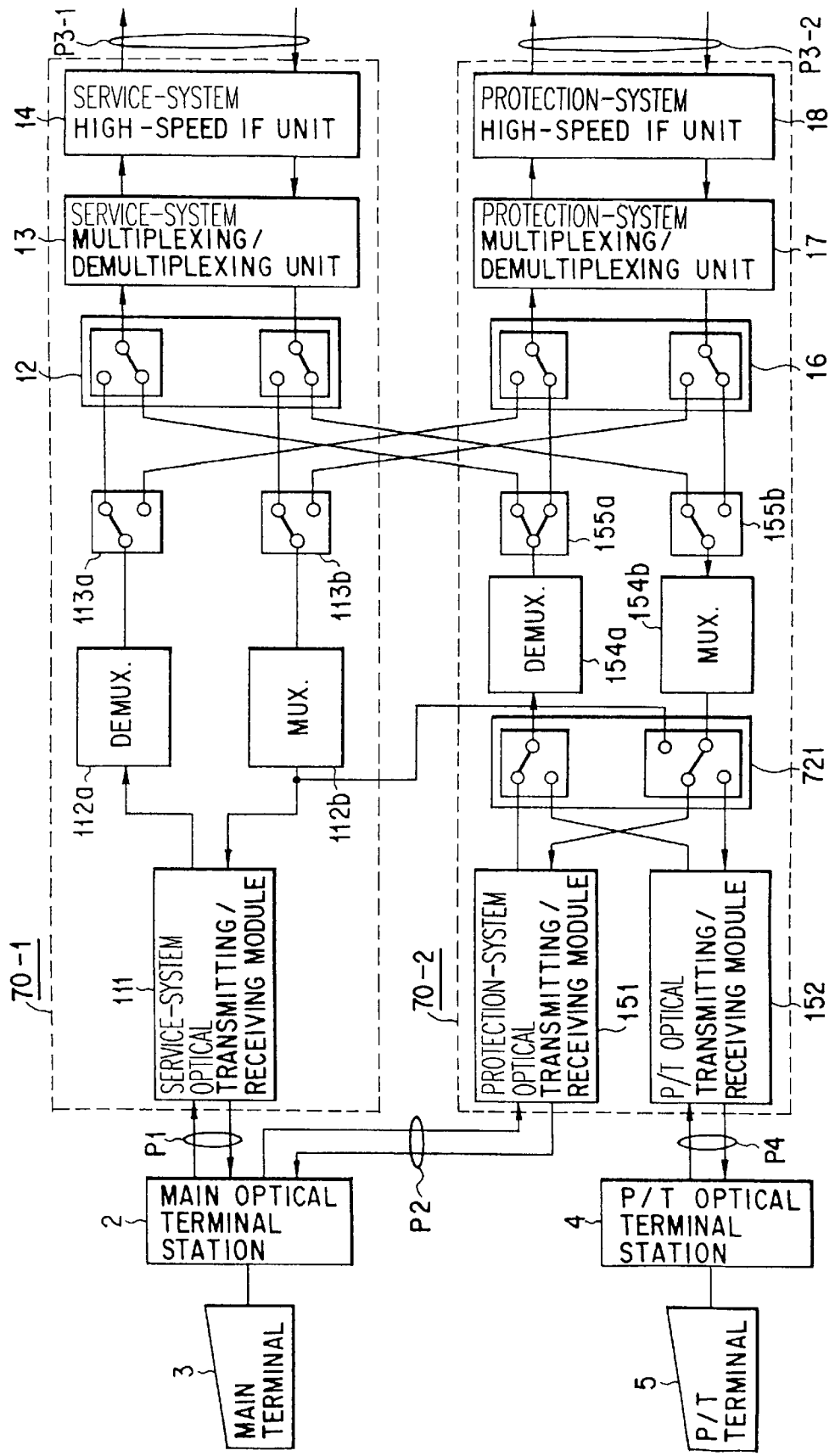
FIG. 13 is a connection diagram of various components for one channel of the n channels accommodated by the optical multiplex terminal station apparatus of FIG. 9 in the event of a failure in the service-system selecting/distributing unit, the service-system multiplexing/demultiplexing unit, the service-system high-speed interface unit, or the service-system optical transmission path.

When a fault occurs in the service-system selecting/distributing unit 12, the service-system multiplexing/demultiplexing unit 13, the service-system high-speed interface unit 14, or the service-system optical transmission path P3-1, the service-system/protection-system switching unit 20 controls the changeover switch 721 in the protection-system low-speed interface unit 72 so as to select the protection-system optical transmitting/receiving module 151. The switching unit 20 also controls the changeover switch 721 so as to stop the application of a signal from the service-system low-speed interface unit 71 to the protection-system optical transmitting/receiving module 151. In this state, various components corresponding to one of the n channels accommodated by the optical multiplex terminal station apparatus 7 are connected as shown in FIG. 13.

When the protection-system optical transmitting/ receiving module 151 is used for original communications, a signal subjected to the termination processing in the multiplexer 112a is prevented from entering the protection-system optical transmitting/receiving module 151 by the changeover switch 721.

In this way, even if the protection system 70-2 performs processing for communications made by the P/T terminal 5, the service-system optical transmission path P1 and the protection-system optical transmission path P2 are fed with a signal, preventing erroneous fault detection such as input interruption. Thus, unless a real fault occurs in the protection-system optical transmission path P2 associated with the main optical terminal station 2, the line can be kept in the normal operating state, allowing smooth switching in starting communications using that line.

Figure 14:
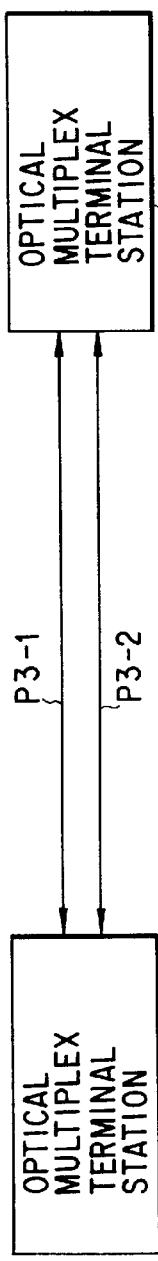
FIG. 14 shows a feasible communications system using the optical multiplex terminal station apparatuses according to the first and second embodiments of the invention.

The use of the optical multiplexing terminal stations 1 and 7 according to the first and second embodiments described above allows a communications system in which two optical multiplex terminal stations 140-1 and 140-2 are interconnected by service-system and protection-system optical transmission paths P1 and P2 as shown in FIG. 14 to be implemented.

Figure 15:
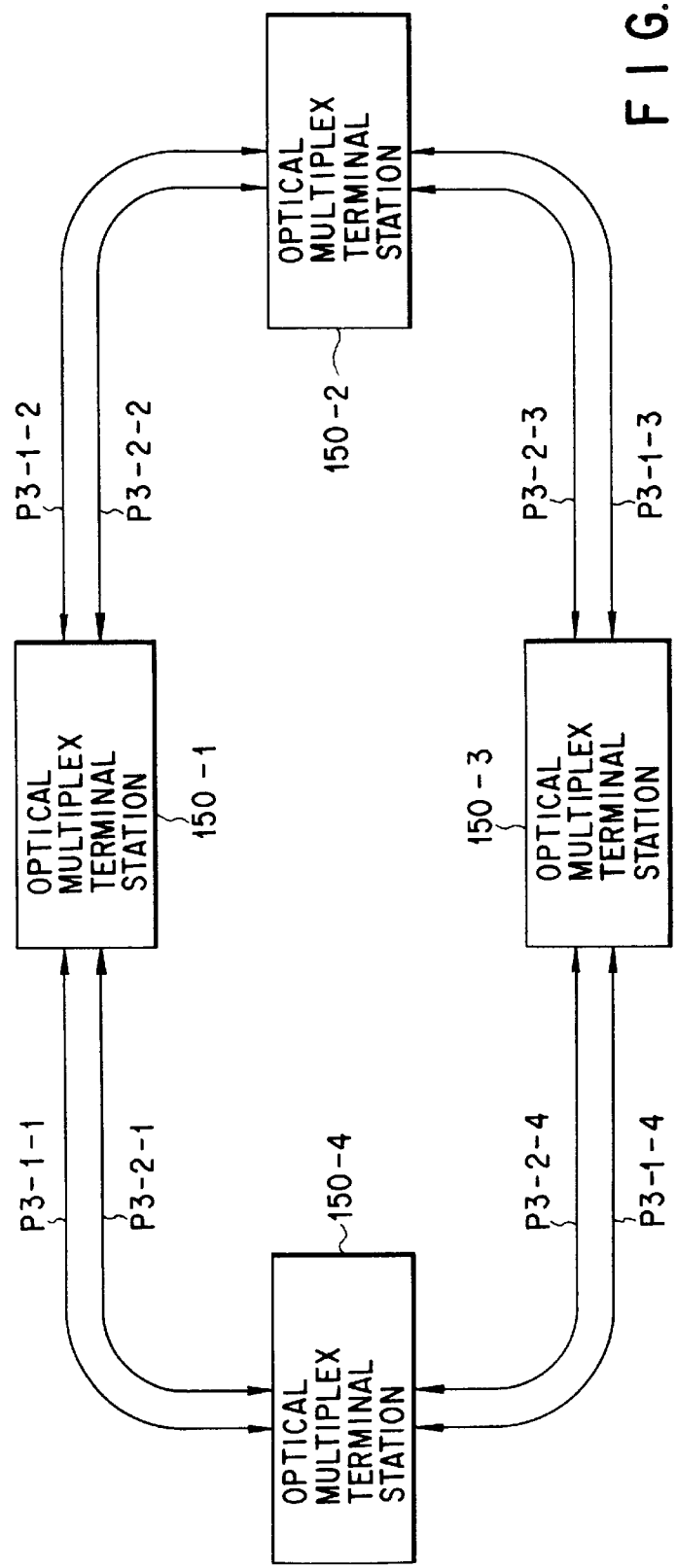
FIG. 15 shows a communications system in which optical multiplex terminal stations are interconnected in a ring configuration.

However, the terminal stations 1 and 7 are not suitable for such a communications system as shown in FIG. 15 in which three or more optical multiplexing terminal stations 150 (four stations in FIG. 15: 150-1 to 150-4) are interconnected in a ring configuration.

Hereinafter, a description will be given of an embodiment of an optical multiplex terminal station apparatus which is adapted to implement a communications system in which three or more terminal stations are interconnected in a ring configuration as shown in FIG. 15.

Figure 16:
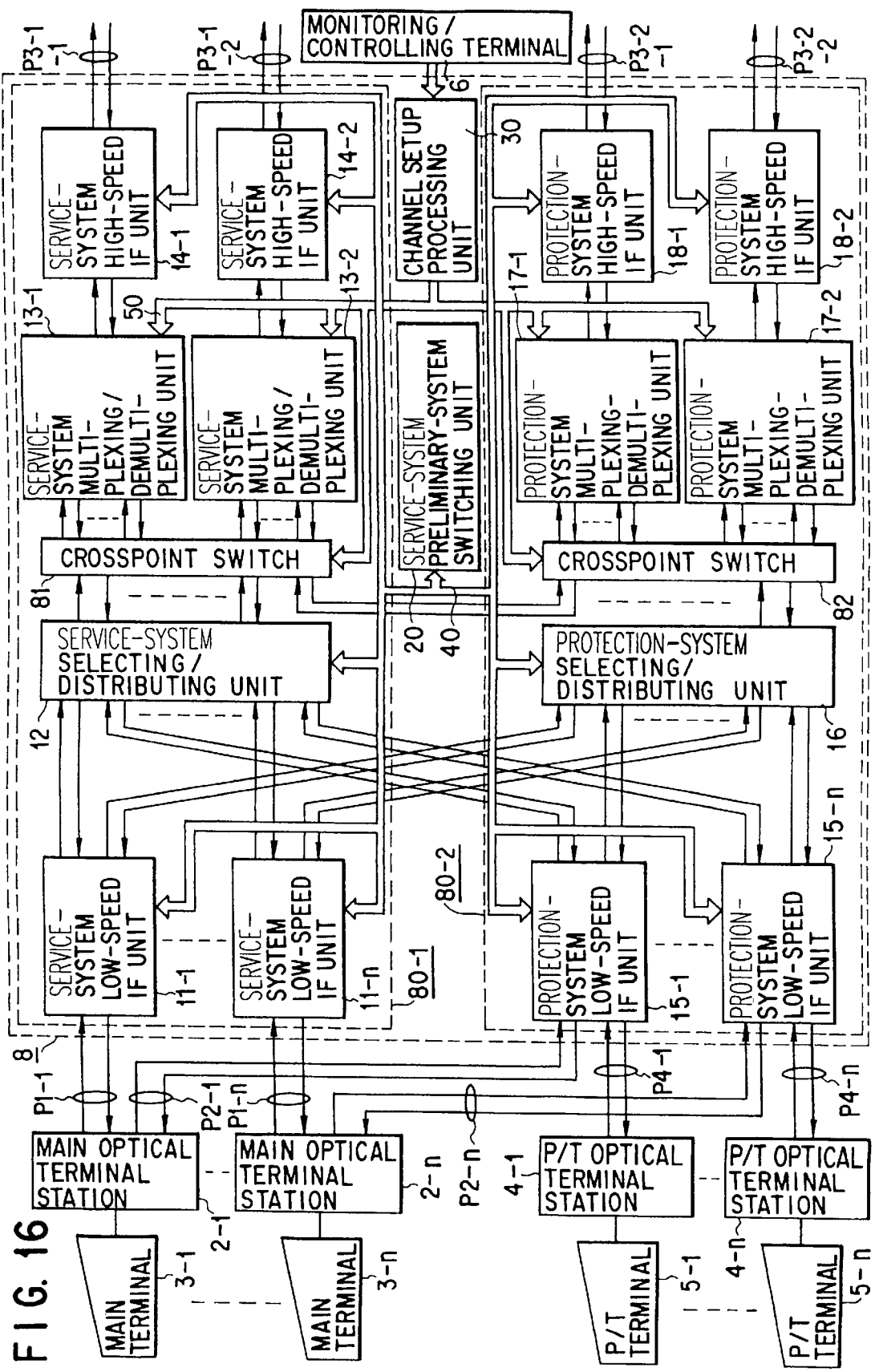
FIG. 16 is a block diagram of an optical multiplex terminal station apparatus according to a third embodiment of the invention.

FIG. 16 is a block diagram of an optical multiplex terminal station apparatus according to a third embodiment of the invention. In this figure, like reference numerals are used to denote corresponding components to those in FIG. 1 and their description will be omitted.

In FIG. 16, reference numeral 8 denotes an optical multiplexing terminal station, which includes a service system 80-1, a protection system 80-2, a service-system/protection-system switching unit 20, and a channel setup unit 30. A monitoring/controlling terminal 6 is connected to the channel setup unit 30.

In the terminal station 8 of the present embodiment, the service system 10-1 and the protection system 10-2 in the terminal station 1 of the first embodiment are replaced with the service system 80-1 and the protection system 80-2, respectively.

The service system 80-1 includes n service-system low-speed interface units 71 (11-1 to 11-n), a service-system selecting/distributing unit 12, two service-system multiplexing/demultiplexing units 13 (13-1, 13-2), two service-system high-speed interface units 14 (14-1, 14-2), and a matrix switch 81.

Here, one of the two service-system multiplexing/ demultiplexing units 13, i.e., the service-system multiplexing/demultiplexing unit 13-1, and one of the service-system high-speed interface units 14, i.e., the service-system high-speed interface unit 14-1, correspond to one of the two service-system optical transmission paths P3-1, i.e., the service-system optical transmission path P3-1-1. The other of the two service-system multiplexing/ demultiplexing units 13, i.e., the service-system multiplexing/demultiplexing unit 13-2, and the other of the service-system high-speed interface units 14, i.e., the service-system high-speed interface unit 14-2, correspond to the other of the two service-system optical transmission paths P3-1, i.e., the service-system optical transmission path P3-1-2.

The protection system 80-2 includes n protection-system low-speed interface units 15 (15-1 to 15-n), a protection-system selecting/distributing unit 16, two protection-system multiplexing/demultiplexing units 17 (17-1, 17-2), two protection-system high-speed interface units 18 (18-1, 18-2), and a matrix switch 82.

Here, one of the two protection-system multiplexing/ demultiplexing units 17, i.e., the protection-system multiplexing/demultiplexing unit 17-1, and one of the protection-system high-speed interface units 18, i.e., the protection-system high-speed interface unit 18-1, correspond to one of the two protection-system optical transmission paths P3-2, i.e., the protection-system optical transmission path P3-2-1. The other of the two protection-system multiplexing/demultiplexing units 17, i.e., the protection-system multiplexing/demultiplexing unit 17-2, and the other of the protection-system high-speed interface units 18, i.e., the protection-system high-speed interface unit 18-2, correspond to the other of the two protection-system optical transmission paths P3-2, i.e., the protection-system optical transmission path P3-2-2.

The matrix switch 81 establishes connections among signal lines which, of signal lines connected to the service-system low-speed interface units 11-1 to 11-n and signal lines connected to the protection-system low-speed interface units 15-1 to 15-n, are selected by the service-system selecting/distributing unit 12, a plurality of signal lines connected to the service-system multiplexing/ demultiplexing unit 13-1, a plurality of signal lines connected to the service-system multiplexing/demultiplexing unit 13-2, and signal lines (though only one pair of lines are shown, two or more pairs of lines may be connected) connected to the matrix switch 82.

The matrix switch 82 establishes connections among signal lines which, of signal lines connected to the service-system low-speed interface units 11-1 to 11-n and signal lines connected to the protection-system low-speed interface units 15-1 to 15-n, are selected by the protection-system selecting/distributing unit 16, a plurality of signal lines connected to the protection-system multiplexing/ demultiplexing unit 17-1, a plurality of signal lines connected to the protection-system multiplexing/ demultiplexing unit 17-2, and signal lines connected to the matrix switch 81.

How the signal lines are connected in each of the matrix switches 81 and 82 is determined by the channel setup processing unit 30.

Hereinafter, a description will be given of the operation of the optical multiplexing terminal station 8 in a communications system that is implemented as shown in FIG. 15. Here, the operation of the optical multiplexing terminal station 8 as the station 150-1 in FIG. 15 will be described.

How the whole system shown in FIG. 15 operates when it is in normal state will be explained. While the system remains in this state, signals are transmitted among the optical multiplex terminal stations 150 through the service-system optical transmission paths P3-1. The service-system will be described first.

An output signal of each main terminal 3 is input to the matrix switch 81 through the corresponding main terminal station [2], the corresponding service-system low-speed interface unit 11, and the service-system selecting/distributing unit 12. The matrix switch 81 is operated to supply to the service-system multiplexing/demultiplexing unit 31-1 those of the output signals of the main terminals 3 which are to be transferred in the counterclockwise direction (FIG. 15) and also the signals input from the right-side service-system optical transmission paths P3-1-2 and passing through the optical multiplex terminal station 150-1. Further, the switch 81 is operated to supply to the service-system multiplexing/demultiplexing unit 31-2 those of the output signals of the main terminals 3 which are to be transferred in the clockwise direction (FIG. 15) and also the signals input from the left-side service-system optical transmission paths P3-1-1 and passing through the optical multiplex terminal station 150-1. Thus, an output signal of each main terminal 3 is multiplexed with the other signals in the service-system multiplexing/demultiplexing unit 13-1 or 13-2 and then sent over the service-system optical transmission path P3-1-1 or P3-1-2 through the service-system high-speed interface unit 14-1 or 14-2.

A signal transferred over the service-system optical transmission path P3-1-1 or P3-1-2 is separated into low-speed signals by the service-system multiplexing/demultiplexing unit 13-1 or 13-2 and then entered into the matrix switch 81. For a signal required to be transferred to another optical multiplex terminal station apparatus, the matrix switch 81 connects the signal lines under the control of the channel setup processing unit 30 so that it will be directed from one of the service-system multiplexing/demultiplexing units 13 that first received it to the other. For a signal required to be sent to a main terminal 3, the matrix switch connects the signal lines so that it will be sent to the service-system selecting/distributing unit 12. Thus, a signal required to be transferred to the other optical multiplexing terminal station is combined with other signals in the service-system multiplexing/demultiplexing unit 13 as opposed to the service-system multiplexing/demultiplexing unit that first received it and then sent over the service-system optical transmission path P3-1 as opposed to the optical transmission path over which it has been received. A signal to be sent to the main terminal 3 is sent to it through the service-system selecting/distributing unit 12, the service-system low-speed interface unit 11, the service-system optical transmission path P1, and the main optical terminal station 2. When a fault occurs in the service-system optical transmission path P3-1 which is to send a signal to another optical multiplex terminal station apparatus, it is also possible to send it to the other optical multiplex terminal station apparatus over the protection-system optical transmission path P3-2 by connecting signal lines in the matrix switches 81 and 82 so that it will be transferred from the service-system multiplexing/demultiplexing unit 13 through the matrix switches to the protection-system multiplexing/demultiplexing unit 17.

The protection system will now be described. An output signal of the P/T terminal 5 is entered into the matrix switch 82 via the corresponding P/T optical terminal station 4, the corresponding P/T optical transmission path P4, the corresponding protection-system low-speed interface unit 15, and the protection-system selecting/distributing unit 16. A signal received over the protection-system optical transmission path P3-2-1 or P3-2-2 is separated into low-speed signals in the protection-system multiplexing/demultiplexing unit 17-1 or 17-2 and entered into the matrix switch 82. The matrix switch 82 is operated in the same way as the matrix switch 81. An output signal of each P/T terminal is multiplexed with output signals of the other P/T terminals in the protection-system multiplexing/demultiplexing unit 17-1 or 17-2 and then sent over the protection-system optical transmission path P3-2-1 or P3-2-2 through the protection-system high-speed interface unit 18-1 or 18-2.

In the system shown in FIG. 15, a trouble may occur in the service-system optical transmission paths P3-1. If this happens, signals are transmitted not through the paths P3-1, but through the protection-system optical transmission paths. If a trouble has occurred in, for example, the service-system optical transmission paths P3-1-2, signals will be transmitted in the clockwise direction in the optical multiplex terminal station 150-1, as will be explained below.

In the left part of the station 150-1, where no trouble is occurring, signal are input from the service-system optical transmission paths P3-1-1 to the matrix switch 81 via the high-speed interface unit 14-1 and the multiplexing/demultiplexing unit 13-1. The signals to be supplied to the low-speed main optical terminal stations 2-1 to 2-n are transmitted to the service-system selecting/distributing unit 12. These signals are then transmitted to the main optical terminal stations 2-1 to 2-n through the service-system low-speed interface unit 11 or the service-system selecting/distributing unit 12. The signals to pass through the optical multiplex terminal station 150-1 are transferred from the matrix switch 81 to the matrix switch 82.

The signals transmitted from the low-speed main optical terminal stations 2-1 to 2-n are input to the service-system low-speed interface unit 11. The signal lines are switched in the interface unit 11 in accordance with the direction in which the signals are transmitted. More precisely, the signals to be transmitted in the counterclockwise because not trouble has occurred are supplied to the service-system selecting/distributing unit 12. By contrast, the signals to be transmitted in the clockwise because a trouble has occurred are supplied to the protection-system selecting/distributing unit 16.

Also supplied to the protection-system selecting/distributing unit 16 are the signals transmitted from the P/T optical terminal stations 4-1 to 4-n. In the unit 16, the signals supplied from the sections 4-1 to 4-n are selected as signals which are to be transmitted in the counterclockwise direction and are output to the matrix switch 82, as in the case where no trouble occurs. The signals to be transmitted in the clockwise direction are input through the service-system selecting/distributing unit 12. The signal transmitted from the main optical terminal stations 2-1 to 2-n are selected and output to the matrix switch 82.

In the matrix switch 82, the signals are multiplexed with the signals which have been transferred from the matrix switch 81 and which are to pass through the optical multiplex terminal station 150-1. The signals output by the switch 82 are transmitted to the protection-system multiplexing/demultiplexing unit 3-2-2 through the protection-system 17-2 and the protection-system high-speed interface unit 18-2.

Against the troubles in the main terminals 3, main optical terminal stations 2-1 to 2-n, and service-system optical transmission paths P1-1 to P1-n, the same operation is performed as in the first embodiment.

The present invention is not limited to the above embodiments. Though the above embodiments use equal numbers of P/T terminals 5 and main terminals 3, the P/T terminals may be smaller in number than the main terminals.

In the above embodiments, the multiplexing terminal station of the present invention was described as an optical multiplex terminal station apparatus adapted to optical communications. The present invention may be applied to a multiplexing terminal station which makes communications in the form of electrical signals or a multiplexing terminal station which makes communications in the form of radio signals.

In addition, the service-system low-speed interface unit 11 and the protection-system low-speed interface unit 15 in the third embodiment may be replaced with the service-system low-speed interface unit 71 and the protection-system low-speed interface unit 72, respectively, in the second embodiment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multiplex terminal station apparatus for multiplexing signals transmitted over low-speed transmission paths for multiplex transmission over a service-system transmission path or a protection-system transmission path, comprising:

a plurality of service-system low-speed interface means each of which is adapted to interface with a respective one of said low-speed transmission paths;

a plurality of protection-system low-speed interface means each of which is adapted to interface with a respective one of said low-speed transmission paths;

at least one part-time transmission path interface means, provided for a part-time transmission path and provided to correspond with one of said protection-system low-speed interface means, for interfacing with said part-time transmission path;

service-system transmission path interface means for interfacing with said service-system transmission path;

protection-system transmission path interface means for interfacing with said protection-system transmission path;

service-system multiplexing/demultiplexing means for multiplexing a plurality of low-speed signals to be sent over said service-system transmission path to produce a high-speed signal and demultiplexing a high-speed signal received over said service-system transmission path into a plurality of low-speed signals;

protection-system multiplexing/demultiplexing means for multiplexing a plurality of low-speed signals to be sent over said protection-system transmission path to produce a high-speed signal and demultiplexing a high-speed signal received over said protection-system transmission path into a plurality of low-speed signals;

first selector means for selectively connecting each of said service-system low-speed interface means to either said service-system multiplexing/demultiplexing means or said protection-system multiplexing/demultiplexing means and connecting protection-system low-speed interface means corresponding to service-system low-speed interface means that are connected to said service-system multiplexing/demultiplexing means to said protection-system multiplexing/demultiplexing means; and second selector means for disconnecting said protection-system low-speed interface means corresponding to said service-system low-speed interface means connected to said service-system multiplexing/demultiplexing means by said first selector means from said protection-system multiplexing/demultiplexing means and connecting said part-time transmission path interface means corresponding to said protection-system low-speed interface means to said protection-system multiplexing/demultiplexing means.

2. The multiplex terminal station apparatus according to claim 1, wherein said service-system transmission path and said protection-system transmission path are each an optical transmission path, and said service-system transmission path interface means and said protection-system transmission path interface means each have a function of transmitting and receiving an optical signal.

3. The multiplex terminal station apparatus according to claim 1, wherein said low-speed transmission paths and said part-time transmission path are each an optical transmission path, and said service-system low-speed interface means, said protection-system low-speed line interface means and said part-time transmission path interface means each have a function of transmitting and receiving an optical signal.

4. The multiplex terminal station apparatus according to claim 1, further comprising means for routing a received signal from said service-system low-speed interface means to said protection-system low-speed interface means only when said selector means connects said part-time transmission path interface means to said protection-system multiplexing/demultiplexing means.

5. A multiplex terminal station apparatus for multiplexing signals transmitted over low-speed transmission paths for multiplex transmission over two service-system transmission paths or two protection-system transmission paths, comprising:

a plurality of service-system low-speed interface means each of which is adapted to interface with a respective one of said low-speed transmission paths;

a plurality of protection-system low-speed interface means each of which is adapted to interface with a respective one of said low-speed transmission paths;

at least one part-time transmission path interface means, provided for at least one part-time transmission path and provided to correspond with one of said protection-system low-speed interface means, for interfacing with said part-time transmission path;

first and second service-system transmission path interface means for interfacing with a corresponding one of said service-system transmission paths;

first and second protection-system transmission path interface means for interfacing with a corresponding one of said protection-system transmission paths;

first and second service-system multiplexing/demultiplexing means each provided for a corresponding one of said service-system transmission paths for multiplexing a plurality of low-speed signals to be sent over a corresponding one of said service-system transmission paths to produce a high-speed signal and demultiplexing a high-speed signal received over a corresponding one of said service-system transmission paths and a corresponding one of said service-system transmission path interface means into a plurality of low-speed signals;

first and second protection-system multiplexing/demultiplexing means each provided for a corresponding one of said protection-system transmission paths for multiplexing a plurality of low-speed signals to be sent over a corresponding of said protection-system transmission paths to produce a high-speed signal and demultiplexing a high-speed signal received over a corresponding one of said corresponding protection-system transmission paths and a corresponding one of said protection-system transmission path interface means into a plurality of low-speed signals;

first selector means for selecting each of said service-system low-speed interface means to be connected to either said service-system multiplexing/demultiplexing means or said protection-system multiplexing/demultiplexing means and selecting protection-system low-speed interface means corresponding to service-system low-speed interface means that are selected to be connected to said service-system multiplexing/demultiplexing means to be selected to said protection-system multiplexing/demultiplexing means;

second selector means for disconnecting said protection-system low-speed interface means corresponding to said service-system low-speed interface means selected by said first selector means to be connected to said service-system multiplexing/demultiplexing means from said protection-system multiplexing/demultiplexing means and selecting part-time transmission path interface means corresponding to said protection-system low-speed interface means to be connected to said protection-system multiplexing/demultiplexing means; and connection means having a function of connecting said service-system low-speed interface means selected by said first selector means to be connected to said service-system multiplexing/demultiplexing means to said first and second service-system multiplexing/demultiplexing means in a specified manner, a function of connecting said service-system low-speed interface means, said protection-system low-speed interface means and said part-time transmission path interface means selected by said first and second selector means to be selected to said protection-system multiplexing/demultiplexing means to said first and second protection-system multiplexing/demultiplexing means in a specified manner, and a function of connecting said first and second service-system multiplexing/demultiplexing means and said first and second protection-system multiplexing/demultiplexing means in a specified manner.

6. The multiplex terminal station apparatus according to claim 5, wherein said service-system transmission paths and said protection-system transmission paths are each an optical transmission path, and said service-system transmission path interface means and said protection-system transmission path interface means each have a function of transmitting and receiving an optical signal.

7. The multiplex terminal station apparatus according to claim 5, wherein said low-speed transmission paths and said part-time transmission path are each an optical transmission path, and said service-system low-speed interface means, said protection-system low-speed line interface means and said part-time transmission path interface means each have a function of transmitting and receiving an optical signal.

8. The multiplex terminal station apparatus according to claim 5, further comprising means for routing a received signal from said service-system low-speed interface means to said protection-system low-speed interface means only when said second selector means connects said part-time transmission path interface means to said protection-system multiplexing/demultiplexing means.

* * * * *